United States Patent
Bewlay et al.

(10) Patent No.: US 9,192,983 B2
(45) Date of Patent: Nov. 24, 2015

(54) SILICON CARBIDE-CONTAINING MOLD AND FACECOAT COMPOSITIONS AND METHODS FOR CASTING TITANIUM AND TITANIUM ALUMINIDE ALLOYS

(71) Applicant: GENERAL ELECTRIC COMPANY, Schenectady, NY (US)

(72) Inventors: Bernard Patrick Bewlay, Niskayuna, NY (US); Joan McKiever, Ballston Lake, NY (US); Brian Michael Ellis, Mayfield, NY (US); Nicholas Vincent McClasky, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 156 days.

(21) Appl. No.: 14/090,773

(22) Filed: Nov. 26, 2013

(65) Prior Publication Data
US 2015/0144286 A1    May 28, 2015

(51) Int. Cl.
| | |
|---|---|
| B22C 3/00 | (2006.01) |
| B22C 9/02 | (2006.01) |
| B22C 1/00 | (2006.01) |
| B22C 9/22 | (2006.01) |
| C09D 1/00 | (2006.01) |
| C08K 3/34 | (2006.01) |
| C08K 3/22 | (2006.01) |

(52) U.S. Cl.
CPC ... *B22C 3/00* (2013.01); *B22C 1/00* (2013.01); *B22C 9/02* (2013.01); *B22C 9/22* (2013.01); *C08K 3/22* (2013.01); *C08K 3/34* (2013.01); *C09D 1/00* (2013.01); *C08K 2003/2206* (2013.01); *C08K 2003/2227* (2013.01)

(58) Field of Classification Search
CPC .............. B22C 1/00; B22C 3/00; B22C 9/02; B22C 9/22
USPC ............... 164/23, 24, 361, 516–520, 529; 106/38.2, 38.22, 38.27, 38.9
See application file for complete search history.

(56) References Cited

U.S. PATENT DOCUMENTS

| | | |
|---|---|---|
| 2,781,261 A | 2/1957 | Kamlet |
| 2,837,426 A | 6/1958 | Kamlet |
| 3,084,060 A | 4/1963 | Baer et al. |
| 3,180,632 A | 4/1965 | Katz et al. |

(Continued)

FOREIGN PATENT DOCUMENTS

| | | |
|---|---|---|
| CA | 2057373 | 12/1991 |
| CN | 1060683 | 4/1992 |

(Continued)

OTHER PUBLICATIONS

PCT Search Report and Written Opinion dated Jan. 2, 2014, issued in connection with corresponding WO Patent Application No. PCT/US2013/050850.

(Continued)

*Primary Examiner* — Kevin E Yoon
(74) *Attorney, Agent, or Firm* — Scott J. Asmus

(57) ABSTRACT

The disclosure relates generally to mold compositions and methods of molding and the articles so molded. More specifically, the disclosure relates to silicon carbide-containing mold compositions, silicon carbide-containing intrinsic facecoat compositions, and methods for casting titanium-containing articles, and the titanium-containing articles so molded.

30 Claims, 6 Drawing Sheets

(56) References Cited

U.S. PATENT DOCUMENTS

| | | |
|---|---|---|
| 3,188,231 A | 6/1965 | Jastrzebski |
| 3,286,312 A | 11/1966 | Davis et al. |
| 3,565,643 A | 2/1971 | Bergna |
| 3,660,075 A | 5/1972 | Harbur et al. |
| 3,676,161 A | 7/1972 | Yates |
| 3,734,480 A | 5/1973 | Zanis et al. |
| 3,787,143 A | 1/1974 | Carbonnel et al. |
| 3,961,995 A | 6/1976 | Alliot et al. |
| 3,969,195 A | 7/1976 | Dötzer et al. |
| 4,028,096 A | 6/1977 | Banker et al. |
| 4,040,845 A | 8/1977 | Richerson et al. |
| 4,148,204 A | 4/1979 | Dötzer et al. |
| 4,356,152 A | 10/1982 | Berkman et al. |
| 4,661,316 A | 4/1987 | Hashimoto et al. |
| 4,703,806 A | 11/1987 | Lassow et al. |
| 4,710,348 A | 12/1987 | Brupbacher et al. |
| 4,723,764 A | 2/1988 | Mizuhara |
| 4,740,246 A | 4/1988 | Feagin |
| 4,746,374 A | 5/1988 | Froes et al. |
| 4,793,971 A | 12/1988 | Eckert et al. |
| 4,802,436 A | 2/1989 | Wilson et al. |
| 4,808,372 A | 2/1989 | Koczak et al. |
| 4,892,693 A | 1/1990 | Perrotta et al. |
| 4,893,743 A | 1/1990 | Eylon et al. |
| 4,919,886 A | 4/1990 | Venkataraman et al. |
| 4,951,929 A | 8/1990 | Schwarz et al. |
| 4,966,225 A | 10/1990 | Johnson et al. |
| 4,996,175 A | 2/1991 | Sturgis |
| 5,011,554 A | 4/1991 | Fleischer |
| 5,098,484 A | 3/1992 | Eylon et al. |
| 5,098,653 A | 3/1992 | Shyh-Chin |
| 5,102,450 A | 4/1992 | Huang |
| 5,152,853 A | 10/1992 | Fleischer |
| 5,190,603 A | 3/1993 | Nazmy et al. |
| 5,205,984 A | 4/1993 | Rowe |
| 5,263,530 A | 11/1993 | Colvin |
| 5,284,620 A | 2/1994 | Larsen, Jr. |
| 5,287,910 A | 2/1994 | Colvin et al. |
| 5,296,055 A | 3/1994 | Matsuda |
| 5,297,615 A | 3/1994 | Aimone et al. |
| 5,299,619 A | 4/1994 | Chandley et al. |
| 5,305,817 A | 4/1994 | Borisov et al. |
| 5,346,184 A | 9/1994 | Ghosh |
| 5,350,466 A | 9/1994 | Larsen, Jr. et al. |
| 5,354,351 A | 10/1994 | Kampe et al. |
| 5,366,570 A | 11/1994 | Mazur et al. |
| 5,368,657 A | 11/1994 | Anderson et al. |
| 5,372,663 A | 12/1994 | Shibue et al. |
| 5,407,001 A | 4/1995 | Yasrebi et al. |
| 5,424,027 A | 6/1995 | Eylon |
| 5,427,173 A | 6/1995 | Das et al. |
| 5,429,778 A | 7/1995 | Patel et al. |
| 5,443,892 A | 8/1995 | Holcombe et al. |
| 5,453,243 A | 9/1995 | Hansen et al. |
| 5,476,679 A | 12/1995 | Lewis et al. |
| 5,503,798 A | 4/1996 | Singheiser et al. |
| 5,580,403 A | 12/1996 | Mazur et al. |
| 5,602,197 A | 2/1997 | Johnson et al. |
| 5,603,759 A | 2/1997 | Burkhart |
| 5,626,179 A | 5/1997 | Choudhury et al. |
| 5,678,298 A | 10/1997 | Colvin et al. |
| 5,749,937 A | 5/1998 | Detering et al. |
| 5,766,329 A | 6/1998 | LaSalle et al. |
| 5,776,617 A | 7/1998 | Brady et al. |
| 5,823,243 A | 10/1998 | Kelly |
| 5,839,504 A | 11/1998 | Matsuda |
| 5,908,516 A | 6/1999 | Nguyen-Dinh |
| 5,942,057 A | 8/1999 | Hanamura et al. |
| 5,944,088 A | 8/1999 | Feagin |
| 5,950,706 A | 9/1999 | Choudhury et al. |
| 5,981,083 A | 11/1999 | Colvin et al. |
| 5,997,802 A | 12/1999 | Holcombe, Jr. et al. |
| 6,136,094 A | 10/2000 | Yamaji et al. |
| 6,174,387 B1 | 1/2001 | Bellows et al. |
| 6,174,495 B1 | 1/2001 | Nishikiori |
| 6,250,366 B1 | 6/2001 | Choudhury et al. |
| 6,283,195 B1 | 9/2001 | Chandley et al. |
| 6,284,389 B1 | 9/2001 | Jones et al. |
| 6,352,101 B1 | 3/2002 | Ghosh et al. |
| 6,355,362 B1 | 3/2002 | Jones et al. |
| 6,380,114 B1 | 4/2002 | Brandy |
| 6,408,929 B2 | 6/2002 | Choudhury et al. |
| 6,409,963 B1 | 6/2002 | Gohres et al. |
| 6,425,504 B1 | 7/2002 | Besser et al. |
| 6,443,212 B1 | 9/2002 | Choudhury et al. |
| 6,488,073 B1 | 12/2002 | Blenkinsop et al. |
| 6,524,407 B1 | 2/2003 | Paul et al. |
| 6,596,963 B2 | 7/2003 | Kelly |
| 6,660,109 B2 | 12/2003 | Hajaligol et al. |
| 6,669,791 B2 | 12/2003 | Tetsui et al. |
| 6,705,385 B2 | 3/2004 | Ray et al. |
| 6,723,279 B1 | 4/2004 | Withers et al. |
| 6,746,508 B1 | 6/2004 | Deevi et al. |
| 6,755,239 B2 | 6/2004 | Ray et al. |
| 6,776,214 B2 | 8/2004 | Ray et al. |
| 6,799,626 B2 | 10/2004 | Ray et al. |
| 6,868,814 B2 | 3/2005 | Baur et al. |
| 6,923,934 B2 | 8/2005 | Nishikiori |
| 7,157,148 B2 | 1/2007 | Takai et al. |
| 7,360,579 B2 | 4/2008 | Renkel et al. |
| 7,389,808 B2 | 6/2008 | Renkel et al. |
| 7,389,809 B2 | 6/2008 | Renkel et al. |
| 7,448,433 B2 | 11/2008 | Ortiz et al. |
| 7,500,511 B2 * | 3/2009 | Connors et al. ............ 164/519 |
| 7,761,969 B2 | 7/2010 | Bewlay et al. |
| 8,062,581 B2 | 11/2011 | Bewlay et al. |
| 8,075,713 B2 | 12/2011 | Renkel |
| 8,136,572 B2 | 3/2012 | Renkel |
| 8,136,573 B2 | 3/2012 | Renkel |
| 8,167,023 B2 | 5/2012 | Renkel |
| 8,579,013 B2 | 11/2013 | Bewlay et al. |
| 8,708,033 B2 | 4/2014 | Bewlay et al. |
| 2002/0108679 A1 | 8/2002 | Chandley et al. |
| 2003/0051780 A1 | 3/2003 | Blenkinsop et al. |
| 2004/0045644 A1 | 3/2004 | Guther et al. |
| 2005/0084407 A1 | 4/2005 | Myrick |
| 2007/0107202 A1 | 5/2007 | Das |
| 2007/0199676 A1 | 8/2007 | Wolter |
| 2007/0280328 A1 | 12/2007 | Lee et al. |
| 2008/0003453 A1 | 1/2008 | Ogren |
| 2008/0156147 A1 | 7/2008 | Kelly et al. |
| 2008/0156453 A1 | 7/2008 | Kelly et al. |
| 2008/0260608 A1 | 10/2008 | Rancoule |
| 2008/0290568 A1 | 11/2008 | Bewlay et al. |
| 2009/0050284 A1 | 2/2009 | Seserko |
| 2009/0133850 A1 | 5/2009 | Kelly et al. |
| 2009/0169415 A1 | 7/2009 | Chikugo et al. |
| 2009/0321038 A1 | 12/2009 | Renkel |
| 2010/0025001 A1 | 2/2010 | Lee et al. |
| 2010/0089500 A1 | 4/2010 | Renkel |
| 2010/0139550 A1 | 6/2010 | Aichele et al. |
| 2010/0237224 A1 | 9/2010 | Laudenklos |
| 2011/0091324 A1 | 4/2011 | Holzschuh |
| 2011/0094705 A1 | 4/2011 | Kelly et al. |
| 2011/0203760 A1 * | 8/2011 | Renkel ............ 164/14 |
| 2011/0203761 A1 | 8/2011 | Renkel |
| 2011/0315338 A1 | 12/2011 | Gigliotti et al. |
| 2012/0067541 A1 | 3/2012 | Evertz et al. |
| 2013/0000862 A1 * | 1/2013 | Cretegny et al. ............ 164/61 |
| 2013/0084190 A1 | 4/2013 | Bewlay et al. |
| 2013/0108459 A1 | 5/2013 | Bewlay et al. |
| 2013/0210320 A1 | 8/2013 | Bewlay et al. |
| 2013/0224066 A1 | 8/2013 | Bewlay et al. |
| 2013/0248061 A1 | 9/2013 | Kelly et al. |
| 2013/0251537 A1 | 9/2013 | Weimer et al. |
| 2014/0209268 A1 | 7/2014 | Bewlay et al. |

FOREIGN PATENT DOCUMENTS

| | | |
|---|---|---|
| CN | 101829770 | 9/2010 |
| DE | 19752777 A1 | 7/1999 |
| DE | 19908952 A1 | 9/1999 |
| DE | 10125129 A1 | 1/2003 |
| DE | 102009027019 A1 | 11/2010 |

(56) References Cited

FOREIGN PATENT DOCUMENTS

| | | |
|---|---|---|
| EP | 0096985 A1 | 12/1983 |
| EP | 0238758 A2 | 9/1987 |
| EP | 0529594 A1 | 3/1993 |
| EP | 0530968 A1 | 3/1993 |
| EP | 0560070 A1 | 9/1993 |
| EP | 0753593 A1 | 1/1997 |
| EP | 1061149 A1 | 12/2000 |
| EP | 1797977 A2 | 6/2007 |
| GB | 569852 | 6/1945 |
| GB | 783411 A | 9/1957 |
| GB | 1464157 A | 2/1977 |
| GB | 2248071 A | 3/1992 |
| GB | 2440334 A | 1/2008 |
| JP | 54157780 | 12/1979 |
| JP | 61129568 A | 6/1986 |
| JP | 01139988 A | 6/1989 |
| JP | 01184392 A | 7/1989 |
| JP | 03282187 A | 12/1991 |
| JP | 0499840 A | 3/1992 |
| JP | 06009290 | 1/1994 |
| JP | 06179930 | 6/1994 |
| JP | 06269927 A | 9/1994 |
| JP | 0789789 A | 4/1995 |
| JP | 10204555 A | 8/1998 |
| JP | 11116399 A | 4/1999 |
| JP | 2001208481 A | 8/2001 |
| JP | 2003056988 A | 2/2003 |
| WO | 8606366 A1 | 11/1986 |
| WO | 8803520 A1 | 5/1988 |
| WO | 8910982 A1 | 11/1989 |
| WO | 9013377 A1 | 11/1990 |
| WO | 9622849 | 8/1996 |
| WO | 9630552 A1 | 10/1996 |
| WO | 9832557 A1 | 7/1998 |
| WO | 9927146 A1 | 6/1999 |
| WO | 0044959 A1 | 8/2000 |
| WO | 0067541 A1 | 11/2000 |
| WO | 2008049452 A1 | 5/2008 |
| WO | 2011048423 A1 | 4/2011 |

OTHER PUBLICATIONS

International Search Report and Written Opinion issued in connection with corresponding PCT Application No. PCT/US2014/064554 dated Jul. 28, 2015.

* cited by examiner

100

| | |
|---|---|
| mixing calcium aluminate and silicon carbide with a liquid to produce a slurry, wherein the percentage of solids in the slurry is about 60% to about 80% by weight of the slurry and the viscosity of the slurry is about 30 to about 1500 centipoise | ~110 |
| introducing the slurry into a mold cavity that contains a fugitive pattern | ~120 |
| allowing the slurry to cure in the mold cavity to form the mold for casting the titanium-containing article | ~130 |

| Obtaining an investment casting mold composition comprising calcium aluminate and large scale aluminum oxide, wherein the calcium aluminate and alumina are combined with a liquid and silicon carbide to produce a final calcium aluminate / liquid mixture slurry, and wherein the solids in this final mixture is about 70% to about 95% by weight of the slurry | ~210 |
|---|---|
| Pouring said investment casting mold composition into a vessel containing a fugitive pattern | ~220 |
| Curing the investment casting mold composition | ~230 |
| Removing the fugitive pattern from the mold | ~240 |
| Firing the mold | ~250 |
| Preheating the mold to a mold casting temperature | ~260 |
| Pouring molten titanium or titanium alloy into the heated mold | ~270 |
| Solidifying the molten titanium or titanium alloy and forming a solidified titanium or titanium alloy casting | ~280 |
| Removing the solidified titanium or titanium alloy casting from the mold | ~290 |

| | |
|---|---|
| providing an investment casting mold, said mold comprising calcium aluminate, silicon carbide and aluminum oxide | ∼ 360 |
| pouring molten titanium or titanium alloy into the mold, wherein the mold is pre-heated prior to the pouring | ∼ 370 |
| solidifying the molten titanium or titanium alloy | ∼ 380 |
| forming a solidified titanium or titanium alloy casting | |
| removing the solidified titanium or titanium alloy casting from the mold to produce a turbine blade, wherein the turbine blade has an average roughness, Ra, of less than 20 across at least a portion of its surface area | ∼ 390 |

| making a mold from a mixture comprising calcium aluminate, calcium dialuminate, silicon carbide, mayenite and water, wherein the silicon carbide is present at about 15% to about 45% by weight | ~ 420 |
| --- | --- |
| firing the mold | ~ 430 |
| pouring molten titanium or titanium alloy into the mold | ~ 440 |
| solidifying the molten titanium or titanium alloy to form a solidified casting | ~ 450 |
| removing the casting from the mold | ~ 460 |

FIG. 6

SILICON CARBIDE-CONTAINING MOLD AND FACECOAT COMPOSITIONS AND METHODS FOR CASTING TITANIUM AND TITANIUM ALUMINIDE ALLOYS

BACKGROUND

Modern gas or combustion turbines must satisfy the highest demands with respect to reliability, weight, power, economy, and operating service life. In the development of such turbines, the material selection, the search for new suitable materials, as well as the search for new production methods, among other things, play an important role in meeting standards and satisfying the demand.

The materials used for gas turbines may include titanium alloys, nickel alloys (also called super alloys) and high strength steels. For aircraft engines, titanium alloys are generally used for compressor parts, nickel alloys are suitable for the hot parts of the aircraft engine, and the high strength steels are used, for example, for compressor housings and turbine housings. The highly loaded or stressed gas turbine components, such as components for a compressor for example, are typically forged parts. Components for a turbine, on the other hand, are typically embodied as investment cast parts.

Although investment casting is not a new process, the investment casting market continues to grow as the demand for more intricate and complicated parts increase. Because of the great demand for high quality, precision castings, there continuously remains a need to develop new ways to make investment castings more quickly, efficiently, cheaply and of higher quality.

Conventional investment mold compounds that consist of fused silica, cristobalite, gypsum, or the like, that are used in casting jewelry and dental prostheses industries are generally not suitable for casting reactive alloys, such as titanium alloys. One reason is because there is a reaction between mold titanium and the investment mold. Any reaction between the molten alloy and the mold will greatly deteriorate the properties of the final casting. The deterioration can be as simple as poor surface finish due to gas bubbles, or in more serious cases, the chemistry, microstructure, and properties of the casting can be compromised.

There is a need for a simple investment mold that does not react significantly with titanium and titanium aluminide alloys. Approaches have been adopted previously with ceramic shell molds for titanium alloy castings. In the prior examples, in order to reduce the limitations of the conventional investment mold compounds, several additional mold materials have been developed. For example, an investment compound was developed of an oxidation-expansion type in which magnesium oxide or zirconia was used as a main component and metallic zirconium was added to the main constituent to compensate for the shrinkage due to solidification of the cast metal. In addition, in another example, an investment compound in which magnesium oxide and aluminum oxide are used as main components, a fine metallic titanium powder is added in order to reduce the amount of shrinkage of the mold and to compensate for the dimensional error caused by the shrinkage of the cast metal on solidification.

However, the above prior art investment compounds have significant limitations. For example, the investment mold compound that is intended to compensate for the shrinkage due to the solidification of the cast metal by the oxidation-expansion of metallic zirconium is difficult to practice, for several reasons. First, a wax pattern is coated on its surface with the new investment compound with zirconium and then the coated wax pattern is embedded in the conventional investment compound in an attempt to make the required amount of zirconium as small as possible; coating the wax with zirconium is very difficult and not highly repeatable. Second, waxes of complex shaped components can not be coated in a sufficiently uniform manner. In addition, the coated layer can come off the wax when the investment mold mix is placed externally around the coated layer and the pattern, with the result that titanium reacts with the externally placed investment mold mix.

There is thus a need for simple and reliable investment casting methods which allow easy extraction of near-net-shape metal or metal alloys from an investment mold that does not react significantly with the metal or metal alloy.

SUMMARY

Aspects of the present disclosure provide casting mold compositions, methods of casting, and cast articles that overcome the limitations of the conventional techniques. Though some aspect of the disclosure may be directed toward the fabrication of components, for example, engine turbine blades, however aspects of the present disclosure may be employed in the fabrication of components in many industries, in particular, those components containing titanium and/or titanium alloys.

One aspect of the present disclosure is a mold for casting a titanium-containing article, comprising: a calcium aluminate cement comprising calcium monoaluminate, calcium dialuminate, and mayenite, wherein the mold has an intrinsic silicon carbide-containing facecoat of about 10 microns to about 500 microns between a bulk of the mold and a mold cavity. In one embodiment, the intrinsic facecoat is a continuous intrinsic facecoat. In one embodiment, the silicon carbide is present at about 15% to about 45% by weight. In one embodiment, the silicon carbide-containing intrinsic facecoat comprises silicon carbide that is present at about 15% to about 45% by weight. In one embodiment, the mold further comprises silicon carbide wherein the silicon carbide-containing intrinsic facecoat has, by weight fraction, at least 10 percent more silicon carbide than the bulk of the mold. In another embodiment, the mold further comprises calcium oxide with more than about 10% by weight and less than about 50% by weight of the mold composition in calcium oxide. In one embodiment, the mold as recited further comprises less than 2% silica, for example, colloidal silica.

The mold, in one example, comprises the bulk of the mold and an intrinsic facecoat, with the bulk of the mold and the intrinsic facecoat having different compositions, and the silicon carbide-containing intrinsic facecoat comprising calcium aluminate with a particle size of less than about 50 microns. In another embodiment, the mold comprises the bulk of the mold and a silicon carbide-containing intrinsic facecoat, wherein the bulk of the mold and the silicon carbide-containing intrinsic facecoat have different compositions and wherein the bulk of the mold comprises alumina particles larger than about 50 microns. The mold, in another example, comprises the bulk of the mold and a silicon carbide-containing intrinsic facecoat, wherein the bulk of the mold comprises alumina particles larger than about 50 microns and the silicon carbide-containing intrinsic facecoat comprises calcium aluminate particles less than about 50 microns in size. In one embodiment, the mold comprises the bulk of the mold and the silicon carbide-containing intrinsic facecoat, wherein the bulk of the mold and the silicon carbide-containing intrinsic facecoat have different compositions and wherein the silicon carbide-containing intrinsic facecoat comprises calcium aluminate with a particle size of less than about 50 microns In certain embodiments, the silicon carbide-containing intrinsic facecoat has, by weight fraction, at least 20 percent more calcium monoaluminate than does the bulk of the mold. In one embodiment, the silicon carbide-containing intrinsic facecoat has, by weight fraction, at least 20 percent less alumina than does the bulk of the mold. In another embodiment, the silicon carbide-containing intrinsic facecoat has, by weight fraction, at least 20 percent more calcium aluminate, at least 20 percent less alumina, and at least 50 percent less mayenite than does the bulk of the mold. In one embodiment, the silicon carbide-containing intrinsic facecoat further comprises alumina and the level of alumina, by weight fraction, is at least 20 percent less than is present in the bulk of the mold. In another embodiment, the silicon carbide-containing intrinsic facecoat further comprises alumina and the level of alumina, by weight fraction, is at least 20 percent less than is present in the bulk of the mold, and wherein the silicon carbide-containing intrinsic facecoat has at least 20 percent more calcium aluminate, and at least 50 percent less mayenite than does the bulk of the mold.

The weight fraction of calcium monoaluminate in the silicon carbide-containing intrinsic facecoat is, in one example, more than 0.45 and the weight fraction of mayenite is less than 0.10. In one embodiment, the calcium monoaluminate in the bulk of the mold comprises a weight fraction of about 0.05 to 0.95, and the calcium monoaluminate in the silicon carbide-containing intrinsic facecoat is about 0.10 to 0.90. In another embodiment, the calcium dialuminate in the bulk of the mold comprises a weight fraction of about 0.05 to about 0.80, and the calcium dialuminate in the silicon carbide-containing intrinsic facecoat is about 0.05 to 0.90. In yet another embodiment, the mayenite in the bulk of the mold composition comprises a weight fraction of about 0.01 to about 0.30, and the mayenite in the silicon carbide-containing intrinsic facecoat is about 0.001 to 0.05. In a particular embodiment, the calcium monoaluminate in the bulk of the mold comprises a weight fraction of about 0.05 to 0.95, and the calcium monoaluminate in the silicon carbide-containing intrinsic facecoat is about 0.1 to 0.90; the calcium dialuminate in the bulk of the mold comprises a weight fraction of about 0.05 to about 0.80, and the calcium dialuminate in the silicon carbide-containing intrinsic facecoat is about 0.05 to 0.90; and wherein the mayenite in the bulk of the mold composition comprises a weight fraction of about 0.01 to about 0.30, and the mayenite in the silicon carbide-containing intrinsic facecoat is about 0.001 to 0.05.

In one example, the mold further comprises aluminum oxide particles in the bulk of the mold that are less than about 500 microns in outside dimension. In one example, the aluminum oxide particles comprise from about 30% by weight to about 68% by weight of the composition used to make the mold. In one embodiment, the mold further comprises hollow oxide particles, for example, hollow aluminum oxide particles. In another embodiment, the calcium aluminate comprises more than 20% by weight of the slurry (that is, more than 20% by weight of the composition used to make the mold). In one embodiment, the mold further comprises more than about 10% by weight and less than about 50% by weight of the mold composition in calcium oxide. In one example, the mold further comprises aluminum oxide particles, magnesium oxide particles, calcium oxide particles, zirconium oxide particles, titanium oxide particles, silicon oxide particles, or compositions thereof.

The percentage of solids in an initial calcium aluminate-liquid cement mixture used to make the mold is, in one example, about 60% to about 78%. In another example, the percentage of solids in the final calcium aluminate-liquid cement mixture (i.e. with the large scale alumina), used to make the mold, is about 70% to about 95%.

One aspect of the present disclosure is a titanium-containing article formed in the mold as disclosed herein. The article, in one example, comprises a titanium aluminide-containing turbine blade.

One aspect of the present disclosure is a facecoat composition of a mold that is used for casting a titanium-containing article, comprising calcium monoaluminate, calcium dialuminate, silicon carbide, and mayenite, wherein the facecoat composition is a silicon carbide-containing intrinsic facecoat, is about 10 microns to about 500 microns thick, and is located between a bulk of the mold and a surface of the mold that opens to a mold cavity. The silicon carbide-rich facecoat comprises, in one example, of calcium aluminate with a particle size of less than about 50 microns. In one embodiment, the silicon carbide is present at about 15% to about 45% by weight of the composition. In one embodiment, the facecoat composition further comprises less than 2% silica, for example, colloidal silica.

In one embodiment, the silicon carbide-containing intrinsic facecoat has, by weight fraction, at least 20 percent more calcium aluminate, at least 20 percent less alumina, and at least 50 percent less mayenite than does the bulk of the mold. In a related example, the silicon carbide-containing intrinsic facecoat has, by weight fraction, at least 10 percent more silicon carbide than does the bulk of the mold. The weight fraction of calcium monoaluminate in the intrinsic facecoat is, in one example, more than 0.45 and the weight fraction of mayenite is less than 0.10. In one embodiment, the calcium monoaluminate in the intrinsic facecoat comprises a weight fraction of 0.10 to 0.90; the calcium dialuminate in the intrinsic facecoat comprises a weight fraction of 0.05 to 0.90; and the mayenite in the intrinsic facecoat comprises a weight fraction of 0.001 to 0.05. In one embodiment, the facecoat composition further comprises silicon carbide wherein the silicon carbide is present at about 15% to about 45% by weight of the facecoat composition.

In one aspect, the present disclosure is a method for forming a mold for casting a titanium-containing article, comprising: mixing calcium aluminate and silicon carbide with a liquid to produce a slurry, wherein the percentage of solids in the initial calcium aluminate/liquid mixture is about 60% to about 80% by weight of the slurry and a viscosity of the slurry is about 30 to about 1500 centipoise; introducing the slurry into a mold cavity that contains a fugitive pattern; and allowing the slurry to cure in the mold cavity to form a mold of a titanium-containing article. In one embodiment, the initial calcium aluminate liquid mixture is a slurry without aluminum oxide, or in another example, without hollow oxide particles, further still, in another example, without large scale hollow oxide particles such as hollow aluminum oxide. In one embodiment, before introducing the slurry into the mold cavity, large scale hollow oxide particles are added to the slurry to form a final calcium aluminate-liquid cement mixture, such that the solids in the slurry are about 70% to about 95% by weight of the slurry. In one embodiment, the final calcium aluminate liquid mixture is a slurry that includes aluminum oxide, or in another example, includes hollow oxide particles, or in yet another example, includes large scale (larger than 50 microns in outside dimension) hollow oxide particles such as hollow aluminum oxide.

In one embodiment, the silicon carbide is added to the calcium aluminate before or during the making of the slurry. In one embodiment, the silicon carbide particles are from about 10 microns to about 50 microns in outside dimension. In one embodiment, the silicon carbide particles are from about 1 micron to about 1000 microns in outside dimension. In another embodiment, the particle size of the calcium aluminate is less than about 50 microns in outside dimension. In one embodiment, the calcium aluminate comprises more than 20% by weight of the slurry (composition used to make the mold).

In one embodiment, before introducing the slurry into the mold cavity oxide particles are added into the slurry. That is, in one embodiment, the slurry further comprises oxide particles. In one embodiment, these oxide particles may be hollow. In one embodiment, the oxide particles are selected from a group consisting of aluminum oxide particles, magnesium oxide particles, calcium oxide particles, zirconium oxide particles, titanium oxide particles, silicon oxide particles, and compositions thereof. The oxide particles may be aluminum oxide (also known as alumina). The aluminum oxide particles can range in size and may be larger than about 50 microns. In particular instances, the added aluminum oxide particles that may be used are less than about 1500 microns in outside dimension. In one embodiment, the aluminum oxide particles are from about 50 microns to about 1500 microns in outside dimension. In one embodiment, the aluminum oxide particles comprises from about 30% by weight to about 68% by weight of the slurry (the composition used to make the mold).

In one embodiment, calcium oxide is added into the slurry before the slurry is introduced into the mold cavity. In one embodiment, the calcium oxide is added such that more than about 10% by weight and less than about 50% by weight of the mold composition is calcium oxide. In another embodiment, the percentage of solids in an initial calcium aluminate-liquid cement mixture is about 60 to about 78%. In one embodiment, the percentage of solids in the final calcium aluminate-liquid cement mixture with the large scale aluminum oxide are about 70% to about 95% by weight of the slurry. In one embodiment, the difference between the initial and final calcium aluminate liquid cement mixture is that while the initial mixture does not have hollow oxide particles, the final mixture does have hollow oxide particles, for example, large scale hollow aluminum oxide particles. In one embodiment of the present method, less than 2% silica is added to the slurry. In one aspect, the present disclosure is directed to the mold made according to the presently disclosed method. In one embodiment, the present disclosure is directed to a titanium aluminide-containing turbine blade made using the mold made by the presently disclosed method.

In one aspect, the present disclosure is a method for casting titanium and titanium alloys, comprising: obtaining an investment casting mold composition comprising calcium aluminate and large scale aluminum oxide, wherein the calcium aluminate is combined with a liquid and silicon carbide to produce a slurry, and wherein the solids in the final calcium aluminate/liquid mixture with the large scale aluminum oxide are about 70% to about 95% by weight of the slurry; pouring said investment casting mold composition into a vessel containing a fugitive pattern; curing said investment casting mold composition; removing said fugitive pattern from the mold; firing the mold; preheating the mold to a mold casting temperature; pouring molten titanium or titanium alloy into the heated mold; solidifying the molten titanium or titanium alloy; forming a solidified titanium or titanium alloy casting; and removing the solidified titanium or titanium alloy casting from the mold. In one embodiment of the method, the percentage of solids in the slurry is about 60% to about 78%.

In one embodiment, the particles of aluminum oxide used in the presently taught method are about 50 microns to about 1500 microns in outside dimension. In one embodiment, the silicon carbide particles are about 10 microns to about 100 microns in outside dimension. In another embodiment, the silicon carbide increases thermal conductivity during casting compared to if casting is performed in the absence of silicon carbide. In one embodiment, the silicon carbide is present between 15% to 45% by weight and provides increased thermal conductivity during casting by at least 25% as compared to casting performed without silicon carbide.

In one embodiment, the silicon carbide particles are from about 10 microns to about 50 microns in outside dimension. In one embodiment, the calcium aluminate particles comprise particles less than about 50 microns in outside dimension. In another embodiment, the aluminum oxide particles are about 50 microns to about 1500 microns in outside dimension, or, in another example, from about 50 microns to about 500 microns in outside dimension. In one embodiment, the silicon carbide particles are about 10 microns to about 50 microns in outside dimension. In another embodiment, the silicon carbide particles are about 1 micron to about 1000 microns in outside dimension. In one embodiment, the aluminum oxide particles comprise from about 30% by weight to about 68% by weight of the investment casting mold composition used to make the mold. In one embodiment, the calcium aluminate comprises more than 20% by weight of the casting mold composition (the investment casting mold composition used to make the mold). One aspect of the present disclosure is a titanium or titanium alloy article made by the casting method as recited by the presently disclosed methods.

One aspect of the present disclosure is a mold composition for casting a titanium-containing article, comprising: a calcium aluminate cement comprising calcium monoaluminate, calcium dialuminate, silicon carbide and mayenite. In one embodiment, the mold composition further comprises hollow particles of aluminum oxide. Another aspect of the present disclosure is a titanium-containing article casting-mold composition comprising calcium aluminate and silicon carbide. For instance, an aspect of the present disclosure may be uniquely suited to providing mold compositions to be used in molds for casting titanium-containing and/or titanium alloy-containing articles or components, for example, titanium containing turbine blades.

In one aspect, the present disclosure is a turbine blade produced by the process, comprising: providing an investment casting mold, said mold comprising calcium aluminate, silicon carbide and aluminum oxide; pouring molten titanium or titanium alloy into the mold; solidifying the molten titanium or titanium alloy; forming a solidified titanium or titanium alloy casting; and removing the solidified titanium or titanium alloy casting from the mold to produce the turbine blade, wherein the turbine blade has an average roughness, Ra, of less than 20 across at least a portion of its surface area. The use of silicon carbide at the range thought herein provides for increased thermal conductivity during casting compared to where casting is performed with little (less than 15% by weight) or no silicon carbide present. In one embodiment, the silicon carbide is provided in particles of about 10 microns to about 100 microns in outside dimension.

One aspect of the disclosure is a method for manufacturing a turbine component, comprising: making a mold from a mixture comprising calcium aluminate, calcium dialuminate, silicon carbide, mayenite and water, wherein the silicon carbide is present at about 15% to about 45% by weight; firing the mold; pouring molten titanium or titanium alloy into the mold; solidifying the molten titanium or titanium alloy to form a solidified casting; and removing the casting from the mold. In one embodiment, the method further comprises hollow aluminum oxide particles that are larger than about 50 microns (large scale alumina). In one embodiment, large scale particles comprise particles of greater than 50 microns in outside dimension, and small scale particles comprise particles of less than 50 microns in outside dimension. The turbine component is, in one embodiment, a turbine blade.

These and other aspects, features, and advantages of this disclosure will become apparent from the following detailed description of the various aspects of the disclosure taken in conjunction with the accompanying drawings.

BRIEF DESCRIPTION OF THE FIGURES

The subject matter, which is regarded as the invention, is particularly pointed out and distinctly claimed in the claims at the conclusion of the specification. The foregoing and other features and advantages of the disclosure will be readily understood from the following detailed description of aspects of the invention taken in conjunction with the accompanying drawings in which:

FIG. 3 shows a flow chart, in accordance with aspects of the disclosure, illustrating a method for forming a mold for casting a titanium-containing article.

FIG. 4 shows a flow chart, in accordance with aspects of the disclosure, illustrating a method for casting titanium and titanium alloys.

FIG. 5 shows a flow chart, in accordance with aspects of the disclosure, illustrating a turbine blade produced by the process shown.

FIG. 6 shows a flow chart, in accordance with aspects of the disclosure, illustrating a method for manufacturing a turbine component.

DETAILED DESCRIPTION

Figure 1:
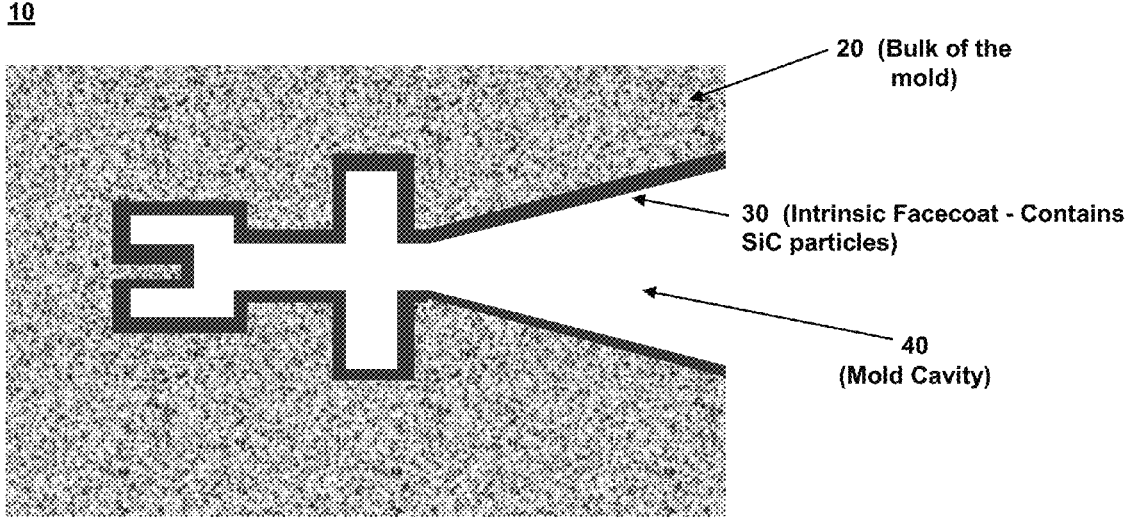
FIG. 1 shows a schematic of the mold with the silicon carbide-containing facecoat.

The present disclosure relates generally to mold compositions and methods of mold making and articles cast from the molds, and, more specifically, to mold compositions and methods for casting titanium-containing articles, and titanium-containing articles so molded.

The manufacture of titanium based components by investment casting of titanium and its alloys in investment shell molds poses problems from the standpoint that the castings should be cast to "near-net-shape." That is, the components may be cast to substantially the final desired dimensions of the component, and require little or no final treatment or machining For example, some conventional castings may require only a chemical milling operation to remove any alpha case present on the casting. However, any sub-surface ceramic inclusions located below the alpha case in the casting are typically not removed by the chemical milling operation and may be formed due to the reaction between the mold facecoat and any reactive metal in the mold, for example, reactive titanium aluminide.

The present disclosure provides a new approach for casting near-net-shape titanium and titanium aluminide components, such as, turbine blades or airfoils. Embodiments of the present disclosure provide compositions of matter for investment casting molds and casting methods that provide improved titanium and titanium alloy components for example, for use in the aerospace, industrial and marine industry. In some aspects, the mold composition provides a mold that contains phases that provide improved mold strength during mold making and/or increased resistance to reaction with the casting metal during casting. The molds according to aspects of the disclosure may be capable of casting at high pressure, which is desirable for near-net-shape casting methods. Mold compositions, for example, containing calcium aluminate cement and alumina particles, and preferred constituent phases, have been identified that provide castings with improved properties.

In one aspect, the constituent phases of the mold comprise calcium monoaluminate ($CaAl_2O_4$). The present inventors found calcium monoaluminate cement desirable for at least two reasons. First, it is understood by the inventors that calcium monoaluminate promotes hydraulic bond formation between the cement particles during the initial stages of mold making, and this hydraulic bonding is believed to provide mold strength during mold construction. Second, it is understood by the inventors that calcium monoaluminate experiences a very low rate of reaction with titanium and titanium aluminide based alloys. In a certain embodiment, calcium monoaluminate is provided to the mold composition of the present disclosure, for example, the investment molds, in the form of calcium aluminate cement. In one aspect, the mold composition comprises a mixture of calcium aluminate cement and alumina, that is, aluminum oxide.

In one aspect of the disclosure, the mold composition provides minimum reaction with the alloy during casting, and the mold provides castings with the required component properties. In a specific embodiment, the facecoat of the mold provides minimum reaction with the alloy during casting, and the mold provides castings with the required component properties. External properties of the casting include features such as shape, geometry, and surface finish. Internal properties of the casting include mechanical properties, microstructure, defects (such as pores and inclusions) below a specified size and within allowable limits.

In one embodiment, the mold contains a continuous intrinsic facecoat that contains silicon carbide; this silicon carbide-containing intrinsic facecoat is located between a bulk of the mold and a mold cavity. In a related embodiment, the silicon carbide-containing intrinsic facecoat is about 10 microns to about 500 microns. In certain instances, the silicon carbide-containing intrinsic facecoat comprises calcium aluminate with a particle size of less than about 50 microns. The mold composition may be such that the bulk of the mold comprises alumina and particles larger than about 50 microns. In a certain embodiment, the silicon carbide-containing facecoat has less alumina than the bulk of the mold, and the silicon carbide-containing facecoat has more calcium aluminate than the bulk of the mold.

The percentage of solids in the initial calcium aluminate-liquid cement mix, and the solids in the final calcium aluminate-liquid cement mix are a feature of the present disclosure. In one embodiment, the disclosure refers to particles, for example, calcium aluminate, aluminum oxide and silicon carbide, as solids. The initial calcium alumuniate-liquid cement mix comprises calcium monoaluminate, calcium dialuminate, mayenite, oxide particles and silicon carbide mixed with water to form a slurry. The final calcium aluminate-liquid mold formulation comprises large scale oxide particles. In one example, the initial calcium aluminate cement mix comprises fine-scale (e.g. less than 50 microns, in one example, less than 10 microns) alumina mixed with water to provide a uniform and homogeneous slurry. In another example, the final calcium aluminate cement mix is formed by adding large-scale (in one example greater than 50 microns and in another example, greater than 100 microns)

alumina to the initial slurry and mixing for between 2 and 15 minutes to achieve a uniform mix.

In one example, the percentage of solids in the initial calcium aluminate-liquid cement mix is about 60% to about 78%. In one example, the percentage of solids in the initial calcium aluminate-liquid cement mix is from about 70% to about 80%. In another example, the solids in the final calcium aluminate-liquid cement mix with the large scale alumina (>100 microns) alumina particles are about 70% to about 95%.

The mold composition of one aspect of the present disclosure provides for low-cost casting of titanium aluminide (TiAl) turbine blades, for example, TiAl low pressure turbine blades. The mold composition may provide the ability to cast near-net-shape parts that require less machining and/or treatment than parts made using conventional shell molds and gravity casting. As used herein, the expression "near-net-shape" implies that the initial production of an article is close to the final (net) shape of the article, reducing the need for further treatment, such as, extensive machining and surface finishing. As used herein, the term "turbine blade" refers to both steam turbine blades and gas turbine blades.

Accordingly, the present disclosure addresses the challenges of producing a mold, for example, an investment mold, that does not react significantly with titanium and titanium aluminide alloys. In addition, according to some aspects of the disclosure, the strength and stability of the mold allow high pressure casting approaches, such as centrifugal casting. One of the technical advantages of this disclosure is that, in one aspect, the disclosure may improve the structural integrity of net shape casting that can be generated, for example, from calcium aluminate cement and alumina investment molds. The higher strength, for example, higher fatigue strength, allows lighter components to be fabricated. In addition, components having higher fatigue strength can last longer, and thus have lower life-cycle costs.

Surface roughness is one of the indices representing the surface integrity of cast and machined parts. Surface roughness is characterized by the centerline average roughness value "Ra", as well as the average peak-to-valley distance "Rz" in a designated area as measured by optical profilometry. A roughness value can either be calculated on a profile or on a surface. The profile roughness parameter (Ra, Rq, . . . ) are more common. Each of the roughness parameters is calculated using a formula for describing the surface. There are many different roughness parameters in use, but $R_a$ is by far the most common. As known in the art, surface roughness is correlated with tool wear. Typically, the surface-finishing process though grinding and honing yields surfaces with Ra in a range of 0.1 mm to 1.6 mm. The surface roughness Ra value of the final coating depends upon the desired function of the coating or coated article.

The average roughness, Ra, is expressed in units of height. In the Imperial (English) system, 1 Ra is typically expressed in "millionths" of an inch. This is also referred to as "microinches". The Ra values indicated herein refer to microinches. An Ra value of 70 corresponds to approximately 2 microns; and an Ra value of 35 corresponds to approximately 1 micron. It is typically required that the surface of high performance articles, such as turbine blades, turbine vanes/nozzles, turbochargers, reciprocating engine valves, pistons, and the like, have an Ra of about 20 or less. One aspect of the present disclosure is a turbine blade comprising titanium or titanium alloy and having an average roughness, Ra, of less than 20 across at least a portion of its surface area.

As the molten metals are heated higher and higher, they tend to become more and more reactive (e.g., undergoing unwanted reactions with the mold surface). Such reactions lead to the formation of impurities that contaminate the metal parts, which result in various detrimental consequences. The presence of impurities shifts the composition of the metal such that it may not meet the desired standard, thereby disallowing the use of the cast piece for the intended application. Moreover, the presence of the impurities can detrimentally affect the mechanical properties of the metallic material (e.g., lowering the strength of the material).

Furthermore, such reactions can lead to surface texturing, which results in substantial, undesirable roughness on the surface of the cast piece. For example, using the surface roughness value Ra, as known in the art for characterizing surface roughness, cast pieces utilizing stainless steel alloys and/or titanium alloys typically exhibit an Ra value between about 100 and 200 under good working conditions. These detrimental effects drive one to use lower temperatures for filling molds. However, if the temperature of the molten metal is not heated enough, the casting material can cool too quickly, leading to incomplete filling of the cast mold.

Casting Mold Composition

Aspects of the present disclosure provide a composition for investment casting molds that can provide improved components of titanium and titanium alloys. In one aspect of the present disclosure, calcium monoaluminate can be provided in the form of calcium aluminate cement. Calcium aluminate cement may be referred to as a "cement" or "binder."

In certain embodiments, calcium aluminate cement is mixed with silicon carbide and alumina particles to provide a castable investment mold mix. The calcium aluminate cement may be greater than about 20% by weight in the castable mold mix. In certain embodiments, the calcium aluminate cement is between about 30% and about 60% by weight in the castable mold mix. The use of greater than 20% by weight of calcium aluminate cement in the castable mold mix (casting mold composition) is a feature of the present disclosure. The selection of the appropriate calcium aluminate cement chemistry, silicon carbide and alumina formulation are factors in the performance of the mold. In one aspect, a sufficient amount of calcium oxide may be provided in the mold composition in order to minimize reaction with the titanium alloy.

In one aspect, the mold composition, for example, the investment mold composition, may comprise a multi-phase mixture of calcium aluminate cement, silicon carbide, and alumina particles. The calcium aluminate cement may function as a binder, for example, the calcium aluminate cement binder may provide the main skeletal structure of the mold structure. The calcium aluminate cement in one example comprises a continuous phase in the mold and provides strength during curing, and casting. The mold composition in a further example consists of calcium aluminate cement, silicon carbide, and alumina, that is, calcium aluminate cement, silicon carbide and alumina may comprise substantially the only components of the mold composition.

In one embodiment, the present disclosure comprises a titanium-containing article casting-mold composition comprising calcium aluminate. In another embodiment, the casting-mold composition further comprises oxide particles, for example, hollow oxide particles. According to aspects of the disclosure, the oxide particles may be aluminum oxide particles, magnesium oxide particles, calcium oxide particles, zirconium oxide particles, titanium oxide particles, silicon oxide particles, combinations thereof, or compositions thereof. In one embodiment, the oxide particles may be a combination of one or more different oxide particles.

The casting-mold composition can further include aluminum oxide, for example, in the form of hollow particles, that is, particles having a hollow core or a substantially hollow core substantially surrounded by an oxide. These hollow aluminum oxide particles may comprise about 99% of aluminum oxide and have about 10 millimeter [mm] or less in outside dimension, such as, diameter. In one embodiment, the hollow aluminum oxide particles have about 1 millimeter [mm] or less in outside dimension, such as, diameter. In another embodiment, the aluminum oxide comprises particles that may have outside dimensions that range from about 10 microns [μm] to about 10,000 microns. In certain embodiments, the hollow oxide particles may comprise hollow alumina spheres (typically greater than about 100 microns in outside dimension or diameter). The hollow alumina spheres may be incorporated into the casting-mold composition, and the hollow spheres may have a range of geometries, such as, round particles, or irregular aggregates. In certain embodiments, the alumina may include both round particles and hollow spheres. In one aspect, these geometries were discovered to increase the fluidity of the investment mold mixture. The inventors conceived of using alumina because, inter alia, alumina is more stable that silica or the silicates that are used in certain prior art applications. The enhanced fluidity that hollow alumina particles provide improves the surface finish and fidelity or accuracy of the surface features of the final casting produced from the mold.

The aluminum oxide comprises particles ranging in outside dimension from about 10 microns to about 10,000 microns. In certain embodiments, the aluminum oxide comprises particles that are less than about 500 microns in outside dimension, for example, diameter. The aluminum oxide may comprise from about 0.5% by weight to about 80% by weight of the casting-mold composition. Alternatively, the aluminum oxide comprises from about 40% by weight to about 60% by weight of the casting-mold composition. Alternatively, the aluminum oxide comprises from about 30% by weight to about 68% by weight of the casting-mold composition.

In one embodiment, the casting-mold composition further comprises calcium oxide. The calcium oxide may be greater than about 10% by weight and less than about 50% by weight of the casting-mold composition. The final mold in one example has a density of less than 2 grams/cubic centimeter and strength of greater than 500 pounds per square inch [psi]. In one embodiment, the calcium oxide is greater than about 30% by weight and less than about 50% by weight of the casting-mold composition. Alternatively, the calcium oxide is greater than about 25% by weight and less than about 35% by weight of the silicon carbide-containing casting-mold composition.

One aspect of the present disclosure is a mold for casting a titanium-containing article, comprising: a calcium aluminate cement comprising calcium monoaluminate, calcium dialuminate, and mayenite, wherein the mold has a silicon carbide-containing intrinsic facecoat of about 10 microns to about 500 microns between a bulk of the mold and a mold cavity. In one embodiment, the facecoat is a continuous silicon carbide-containing intrinsic facecoat.

In a specific embodiment, the casting-mold composition of the present disclosure comprises a calcium aluminate cement. The calcium aluminate cement includes at least three phases or components comprising calcium and aluminum: calcium monoaluminate ($CaAl_2O_4$), calcium dialuminate ($CaAl_4O_7$), and mayenite ($Ca_{12}Al_{14}O_{33}$).

The initial cement formulation is typically not at thermodynamic equilibrium after firing in the cement kiln. However, after mold making and high-temperature firing the silicon carbide-containing mold composition moves towards a thermodynamically stable configuration, and this stability is important for the subsequent casting process. The weight fraction of calcium monoaluminate in the silicon carbide-containing intrinsic facecoat may be more than 0.45 and the weight fraction of mayenite in this facecoat may be less than 0.10. The weight fraction of calcium monoaluminate in the bulk of the mold may be more than 0.5, and weight fraction of mayenite in the bulk of the mold may be less than 0.15. The addition of silicon carbide allows for a mold that is more resistant to reaction during casting, and as a result it is possible to operate at higher casting temperatures.

The calcium monoaluminate in the bulk of the mold may comprise a weight fraction of about 0.05 to 0.95, and the calcium monoaluminate in the silicon carbide-containing intrinsic facecoat is about 0.1 to 0.90. The calcium dialuminate in the bulk of the mold may comprise a weight fraction of about 0.05 to about 0.80, and the calcium dialuminate in the silicon carbide-containing intrinsic facecoat is about 0.05 to 0.90. The mayenite in the bulk of the mold composition may comprise a weight fraction of about 0.01 to about 0.30, and the mayenite in the silicon carbide-containing intrinsic facecoat is about 0.001 to 0.05.

The silicon carbide may be present in both the bulk of the mold and the facecoat in different amounts. For example, the facecoat may contain a higher concentration (per unit volume of the facecoat) of silicon carbide particles than the bulk of the mold; for example 10% more. In a particular embodiment, the bulk of the mold and the intrinsic facecoat have substantially similar concentration (per unit volume) of silicon carbide particles. The inventors have discovered that the use of silicon carbide allows for a mold that is more resistant to reaction during casting, and as a result it is possible to operate at higher casting temperatures. In one embodiment, the silicon carbide is present between 15% to 45% by weight and provides increased thermal conductivity during casting by at least 25% as compared to casting performed without silicon carbide. The inventors of the instant application found that by adding, for example, 25% silicon carbide, the thermal conductivity was increased by more than 50%. In one embodiment, the presence of 15% silicon carbide, the thermal conductivity was increased by more than about 25%. In a particular example, the presence of 25% silicon carbide by weight resulted in an increase of about 50%, about 60%, about 70%, or about 80% in thermal conductivity.

The exact composition of the bulk of the mold and the silicon carbide-containing intrinsic facecoat may differ. For example, the calcium monoaluminate in the bulk of the mold comprises a weight fraction of about 0.05 to 0.95, and the calcium monoaluminate in the silicon carbide-containing intrinsic facecoat is about 0.1 to 0.90; the calcium dialuminate in the bulk of the mold comprises a weight fraction of about 0.05 to about 0.80, and the calcium dialuminate in the silicon carbide-containing intrinsic facecoat is about 0.05 to 0.90; and wherein the mayenite in the bulk of the mold composition comprises a weight fraction of about 0.01 to about 0.30, and the mayenite in the silicon carbide-containing intrinsic facecoat is about 0.001 to 0.05.

The weight fraction of calcium monoaluminate in the calcium aluminate cement may be more than about 0.5, and the weight fraction of mayenite in the calcium aluminate cement may be less than about 0.15. In another embodiment, the calcium aluminate cement is more than 20% by weight of the casting-mold composition. The calcium aluminate cement may have a particle size of about 50 microns or less in outside dimension.

The weight fractions of these phases that are suitable in the cement of the bulk of the mold may be 0.05 to 0.95 of calcium monoaluminate, 0.05 to 0.80 of calcium dialuminate, and 0.01 to 0.30 of mayenite. In contrast, the weight fractions of these phases in the facecoat of the mold may be 0.1 to 0.90 of calcium monoaluminate, 0.05 to 0.90 of calcium dialuminate, and 0.001 to 0.05 of mayenite. The weight fraction of calcium monoaluminate in the facecoat may be more than about 0.6, and the weight fraction of mayenite is less than about 0.1. In one example, the weight fraction of calcium monoaluminate in the cement of the bulk of the mold is more than about 0.5, and weight fraction of mayenite is less than about 0.15.

Calcium mono-aluminate is an important hydraulic mineral present in calcium alumina cement. Its hydration contributes to the high early strength of the investment mold. Mayenite is desired in the cement because it provides strength during the early stages of mold curing due to the fast formation of hydraulic bonds; the mayenite is, however, removed on heat treatment of the molds prior to casting.

The calcium aluminate cement may have a particle size of about 50 microns or less in outside dimension. A particle size of less than 50 microns is used for at least three reasons: first, the fine particle size is believed to promote the formation of hydraulic bonds during mold mixing and curing; second, the fine particle size is understood to promote inter-particle sintering during firing, and this can increase the mold strength; and third, the fine particle size is believed to improve the surface finish of the cast article produced in the mold.

The calcium aluminate cement may be provided as powder, and can be used either in its intrinsic powder form, or in an agglomerated form, such as, as spray dried agglomerates. The calcium aluminate cement can also be preblended with fine-scale (for, example, less than 10 micron in size) alumina. The fine-scale alumina is believed to provide an increase in strength due to sintering during high-temperature firing. In certain instances, larger-scale alumina (for example, alumina with greater than 50 microns in outside dimension) may also be added with or without the fine-scale alumina (for example, alumina with less than 50 microns in outside dimension).

The percentage of solids in the initial calcium aluminate (liquid particle mixture) and the solids in the final calcium aluminate are a feature of the present disclosure. In one example, the percentage of solids in the initial calcium aluminate-liquid particle mix is from about 60% to about 80%. In one example, the percentage of solids in the initial calcium aluminate-liquid particle mix is from about 70% to about 80%. In another example, the solids in the final calcium aluminate-liquid particle mix that is calcium aluminate particles with less than about 50 microns in outside dimension along with large scale alumina particles that are larger than about 70 microns in outside dimension, and silicon carbide particles that are about 5 microns to about 100 microns in outside dimension—are about 70% to about 95%. In one example, the initial calcium aluminate particles are fine scale, in about 5 microns to about 50 microns, and alumina particles of greater than about 70 microns, and silicon carbide of up to about 100 microns in outside dimension are mixed with water to provide a uniform and homogeneous slurry. In some cases, the final mix is formed by adding progressively larger scale alumina particles, for example 70 microns at first and then 150 microns, to the initial slurry and mixing for between 2 and 15 minutes to achieve a uniform mix.

In one embodiment, the large scale particles are hollow particles that have space or pockets of air within the particle (s) such that the particle is not a complete, packed dense particle. The degree of this space/air varies and hollow particles include particles where at least 20% of the volume of the particle is air. In one example, hollow particles are particles where about 5% to about 75% of the volume of the particle is made up of empty space or air. In another example, hollow particles are particles where about 10% to about 80% of the volume of the particle is made up of empty space or air. In yet another example, hollow particles are particles where about 20% to about 70% of the volume of the particle is made up of empty space or air. In another example, hollow particles are particles where about 30% to about 60% of the volume of the particle is made up of empty space or air. In another example, hollow particles are particles where about 40% to about 50% of the volume of the particle is made up of empty space or air.

In another example, hollow particles are particles where about 10% of the volume of the particle is made up of empty space or air. In one example, hollow particles are particles where about 20% of the volume of the particle is made up of empty space or air. In one example, hollow particles are particles where about 30% of the volume of the particle is made up of empty space or air. In one example, hollow particles are particles where about 40% of the volume of the particle is made up of empty space or air. In one example, hollow particles are particles where about 50% of the volume of the particle is made up of empty space or air. In one example, hollow particles are particles where about 60% of the volume of the particle is made up of empty space or air. In one example, hollow particles are particles where about 70% of the volume of the particle is made up of empty space or air. In one example, hollow particles are particles where about 80% of the volume of the particle is made up of empty space or air. In one example, hollow particles are particles where about 90% of the volume of the particle is made up of empty space or air.

The hollow particles, for example hollow alumina particles, serve at least two functions: [1] they reduce the density and the weight of the core, with minimal reduction in strength; strength levels of approximately 500 psi and above are obtained, with densities of approximately 2 g/cc and less; and [2] they reduce the elastic modulus of the mold and help to provide compliance during cool down of the mold and the component after casting. The increased compliance and crushability of the mold may reduce the tensile stresses on the component.

Silicon Carbide-Containing Calcium Aluminate Cement

The present disclosure is directed, inter alia, to a composition for investment casting molds that can provide improved components of titanium and titanium alloys. The mold contains a continuous intrinsic facecoat that contains silicon carbide, between the bulk of mold and the mold cavity. A silicon carbide powder size of less than about 50 microns in outside dimension is employed in the mold making process. The inventors of the instant application found that the use of silicon carbide powder of this size promotes segregation of the particles to the facecoat during mold making Thus, the presence of silicon carbide in the facecoat of the mold provides favorable properties. The bulk of the mold may also contain silicon carbide.

The calcium aluminate cement used in aspects of the disclosure typically comprises three phases or components of calcium and aluminum: calcium monoaluminate ($CaAl_2O_4$), calcium dialuminate ($CaAl_4O_7$), and mayenite ($Ca_{12}Al_{14}O_{33}$). Calcium mono-aluminate is a hydraulic mineral present in calcium alumina cement. Calcium monoaluminate's hydration contributes to the high early strength of the investment mold. Mayenite is desirable in the cement because it provides strength during the early stages of mold curing due to the fast formation of hydraulic bonds. The mayenite is, however, typically removed during heat treatment of the mold prior to casting.

In one aspect, the initial calcium aluminate cement formulation is typically not at thermodynamic equilibrium after firing in the cement manufacturing kiln. However, after mold making and high-temperature firing, the mold composition moves towards a thermodynamically stable configuration, and this stability is advantageous for the subsequent casting process. In one embodiment, the weight fraction of calcium monoaluminate in the cement is greater than 0.5, and weight fraction of mayenite is less than 0.15. The mayenite is incorporated in the mold in both the bulk of the mold and the facecoat because it is a fast setting calcium aluminate and it is believed to provide the bulk of the mold and the facecoat with strength during the early stages of curing. Curing may be performed at low temperatures, for example, temperatures between 15 degrees Celsius and 40 degrees Celsius because the fugitive wax pattern is temperature sensitive and loses its shape and properties on thermal exposure above about 35 degrees C. In one example the mold is cured at temperatures below 30 degrees C.

The calcium aluminate cement may typically be produced by mixing the cement with high purity alumina, silicon carbide and high purity calcium oxide or calcium carbonate; the mixture of compounds is typically heated to a high temperature, for example, temperatures between 1000 and 1500 degrees C. in a furnace or kiln and allowed to react.

The resulting product, known in the art as a cement "clinker," that is produced in the kiln is then crushed, ground, and sieved to produce a calcium aluminate cement of the preferred particle size. Further, the calcium aluminate cement is designed and processed to have a minimum quantity of impurities, such as, minimum amounts of silica, sodium and other alkali, and iron oxide. In one aspect, the target level for the calcium aluminate cement is that the sum of the $Na_2O$, $SiO_2$, $Fe_2O_3$, and $TiO_2$ is less than about 2 weight percent. In one embodiment, the sum of the $Na_2O$, $SiO_2$, $Fe_2O_3$, and $TiO_2$ is less than about 0.05 weight percent. Further, the final mold is designed and processed to have a minimum quantity of impurities, such as, minimum amounts of silica, sodium and other alkali, and iron oxide. In one aspect, the target level for the final mold is that the sum of the $Na_2O$, $SiO_2$, $Fe_2O_3$, and $TiO_2$ is less than about 2 weight percent. In one embodiment, the sum of the $Na_2O$, $SiO_2$, $Fe_2O_3$, and $TiO_2$ is less than about 0.05 weight percent.

In one aspect of the disclosure, a calcium aluminate cement with bulk alumina concentrations over 35% weight in alumina ($Al_2O_3$) and less than 65% weight calcium oxide is provided. In a related embodiment, this weight of calcium oxide is less than 50%. In one example, the maximum alumina concentration of the cement may be about 88% (for example, about 12% CaO). In one embodiment, the calcium aluminate cement is of high purity and contains up to 70% alumina. The weight fraction of calcium monoaluminate may be maximized in the fired mold prior to casting. A minimum amount of calcium oxide may be required to minimize reaction between the casting alloy and the mold. If there is more than 50% calcium oxide in the cement, the inventors found that this can lead to phases such as mayenite and tricalcium aluminate, and these do not perform as well as the calcium monoaluminate during casting. In one example, the range for calcium oxide is less than about 50% and greater than about 10% by weight.

As noted above, the three phases in the calcium aluminate cement/binder in the mold are calcium monoaluminate ($CaAl_2O_4$), calcium dialuminate ($CaAl_4O_7$), and mayenite ($Ca_{12}Al_{14}O_{33}$). The calcium monoaluminate in the cement that generates the facecoat has three advantages over other calcium aluminate phases: 1) the calcium monoaluminate is incorporated in the mold because it has a fast setting response (although not as fast as mayenite) and it is believed to provide the mold with strength during the early stages of curing. The rapid generation of mold strength provides dimensional stability of the casting mold, and this feature improves the dimensional consistency of the final cast component. 2) The calcium monoaluminate is chemically stable with regard to the titanium and titanium aluminide alloys that are being cast. The calcium monoaluminate is used relative to the calcium dialuminate, and other calcium aluminate phases with higher alumina activity; these phases are more reactive with titanium and titanium aluminide alloys that are being cast. 3) The calcium monoaluminate and calcium dialuminate are low expansion phases and are understood to prevent the formation of high levels of stress in the mold during curing, dewaxing, and subsequent casting. The thermal expansion behavior of calcium monoaluminate is a closer match with alumina.

Silicon Carbide-Containing Facecoat

In certain embodiments, the mold contains a continuous silicon carbide-containing intrinsic facecoat between the bulk of mold and the mold cavity. The mold is designed to contain phases that provide improved mold strength during mold making, and the continuous facecoat is designed to provide increased thermal conductivity and increased resistance to reaction during casting. The molds are capable of casting at high pressure, which is desirable for net-shape casting methods. A casting mold composition, a facecoat composition, and preferred constituent phases for the facecoat and the bulk of the mold, have been identified that provide castings with improved properties.

The facecoat is defined as the region of the mold adjacent to the internal surface, or mold cavity in the mold. The intrinsic facecoat is one that only contains species that are provided to the mold from the original constituents of the formulation. Thus, the intrinsic facecoat does not contain any species that did not come from the original poured ceramic formulation. In contrast, extrinsic facecoat is a facecoat that is applied separately and contains species that may not be in the components of the original formulation (e.g., generated in a separate operation). The intrinsic facecoat may be considered, in one example, to be a region about 100 microns thick. The silicon-carbide containing intrinsic facecoat may be about 10 microns to about 500 microns thick. The silicon-carbide containing intrinsic facecoat may be about 10 microns to about 300 microns thick. The silicon-carbide containing intrinsic facecoat may be about 10 microns to about 100 microns thick. The silicon-carbide containing intrinsic facecoat may be about 30 microns to about 200 microns thick. In a particular example, the silicon carbide-containing facecoat is about 50 microns, about 100 microns, about 150 microns, about 200 microns, about 250 microns, about 300 microns, about 350 microns, about 400 microns, about 450 microns, or about 500 microns thick. The facecoat may be continuous. A continuous facecoat allows it to be more effective. The region behind the facecoat and further away from the mold cavity is referred to as the bulk of the mold.

One aspect of the present disclosure is a silicon carbide-containing facecoat composition of a mold that is used for casting a titanium-containing article, the facecoat composition comprising calcium monoaluminate, calcium dialuminate, and mayenite, wherein the facecoat composition is a silicon carbide-containing intrinsic facecoat, is about 10 microns to about 500 microns thick, and is located between the bulk of the mold and the surface of the mold that opens to the mold cavity. The facecoat comprises, in one example, of calcium aluminate with a particle size of less than about 50 microns in outside dimension. The particle sizes of calcium aluminate in the bulk of the mold can be larger than 50 microns in outside dimension.

The facecoat consists of at least the following four phases; calcium monoaluminate ($CaAl_2O_4$), calcium dialuminate ($CaAl_4O_7$), and mayenite ($Ca_{12}Al_{14}O_{33}$); all of these phases except the silicon carbide can be in the initial calcium aluminate cement. The facecoat can also contain fine-scale alumina particles. The bulk of the mold behind the facecoat consists of calcium monoaluminate ($CaAl_2O_4$), calcium dialuminate ($CaAl_4O_7$), mayenite ($Ca_{12}Al_{14}O_{33}$), silicon carbide, and alumina. The alumina can be incorporated as alumina particles, or alumina bubbles. The particles can have a range of geometries, such as round particles, or irregular aggregate. The alumina particle size can be as small as 10 microns and as large as 10 mm. The alumina may consist of both round particles and bubbles, since these geometries increase the fluidity of the investment mold mixture. These particles may be hollow. Typically the alumina particle size in the bulk of the mold is greater than 50 microns. The fluidity impacts the manner in which the cement partitions to the fugitive pattern (such as a wax) during pouring and setting of the investment mold mix around the fugitive pattern. The fluidity affects the surface finish and fidelity of the surface features of the final casting produced from the mold. In one embodiment, the size of the particles in the facecoat are less than 50 microns, and the size of the particles in the bulk of the mold are more than 50 microns.

The present disclosure also provides a silicon carbide-containing intrinsic facecoat composition for investment casting molds, and a bulk mold composition, that together can provide improved cast components of titanium and titanium alloys. The mold may comprise calcium aluminate cement and alumina particles. In one example, the calcium aluminate cement serves two functions. First, the cement generates an in-situ facecoat in the cavity of the mold that is generated by removal of a fugitive pattern, and second it acts as a binder between the alumina particles in the bulk of the mold behind the facecoat. The facecoat in one example contains silicon carbide. The bulk composition of the mold in one example contains between 10 and 50 weight percent of calcium oxide. The composition of CaO in the facecoat in one example is between 20 and 40 weight percent of the mold. The final mold may have a density of less than 2 grams/cubic centimeter and a strength of greater than 500 psi. The mold is designed to contain phases that provide improved mold strength during mold making, and the continuous facecoat that contains silicon carbide, is designed to provide increased thermal conductivity and increased resistance to reaction during casting. The silicon carbide is designed to provide increased thermal conductivity during casting.

The silicon carbide particles are, in one example, about 1 to about 100 microns in outside dimension. In another example, the silicon carbide particles are about 1 to about 50 microns in outside dimension. In a particular example, the silicon carbide particles are about 10 microns to about 30 microns in outside dimension. Alternatively, the silicon carbide particles may be about 20 microns to about 30 microns in outside dimension. In a particular example, silicon carbide particles are about 25 microns in outside dimension. In another example, the silicon carbide particles are about 10 microns, about 15 microns, about 20 microns, about 25 microns, about 30 microns, about 35 microns, about 40 microns, about 45 microns, about 50 microns, about 60 microns, about 70 microns, about 80 microns, about 90 microns, or about 100 microns in outside dimension.

The mold may comprise the bulk of the mold and a silicon carbide-containing intrinsic facecoat, with the bulk of the mold and the silicon carbide-containing intrinsic facecoat having different compositions, and the silicon carbide-containing intrinsic facecoat comprising calcium aluminate with a particle size of less than about 50 microns. The mold may comprise the bulk of the mold and a silicon carbide-containing intrinsic facecoat, wherein the bulk of the mold and the intrinsic facecoat have different compositions and wherein the bulk of the mold comprises alumina particles larger than about 50 microns. The mold, in one example, comprises the bulk of the mold and a silicon carbide-containing intrinsic facecoat, wherein the bulk of the mold comprises alumina particles larger than about 50 microns and the intrinsic facecoat comprises calcium aluminate particles less than about 50 microns in size.

Net shape casting approaches as provided for in the present disclosure allow parts that can be inspected with non destructive methods, such as x-ray, ultrasound, or eddy current, in greater detail and at lower costs. The difficulties associated with attenuation and scattering of the inspection radiation in oversized thick sections is reduced. Smaller defects can potentially be resolved, and this can provide parts with improved mechanical performance.

The present disclosure provides a casting mold composition and a casting process that can provide improved components of titanium and titanium alloys. In one embodiment, the mold is constructed using calcium aluminate cement, or binder, and alumina particles. In an embodiment, the mold contains a silicon carbide-containing intrinsic facecoat between the bulk of mold and the mold cavity. The size of the particles in the facecoat are typically less than 50 microns. The size of the particles in the bulk of the mold can be larger than 50 microns. The size of the particles in the bulk of the mold may be greater than 1 mm. In the facecoat, the size of the particles may be less than 50 microns, and the size of the particles in the bulk of the mold may be more than 50 microns. Generally, the facecoat is a continuous silicon carbide-containing intrinsic facecoat, allowing it to be more effective.

The silicon carbide-containing intrinsic facecoat may have, by weight fraction, at least 20 percent more calcium aluminate, at least 20 percent less alumina, and at least 50 percent less mayenite than does the bulk of the mold. The weight fraction of calcium monoaluminate in the silicon carbide-containing intrinsic facecoat may have more than 0.45 and the weight fraction of mayenite may be less than 0.10. In one example, the calcium monoaluminate in the silicon carbide-containing intrinsic facecoat comprises a weight fraction of 0.1 to 0.9; the calcium dialuminate in the silicon carbide-containing intrinsic facecoat comprises a weight fraction of 0.05 to 0.90; and the mayenite in the silicon carbide-containing intrinsic facecoat comprises a weight fraction of 0.001 to 0.05. The increased weight fraction of calcium monoaluminate in the silicon carbide-containing intrinsic facecoat reduces the rate of reaction of the molten alloy with the mold during casting.

The silicon carbide-containing intrinsic facecoat may have, by weight fraction, at least 20 percent more calcium monoaluminate than the bulk of the mold. The silicon carbide-containing intrinsic facecoat may have, by weight fraction, at least 20 percent less alumina than the bulk of the mold. In one example, the silicon carbide-containing intrinsic facecoat may have, by weight fraction, at least 20 percent more calcium aluminate, at least 20 percent less alumina, and at least 50 percent less mayenite than does the bulk of the mold.

In certain embodiments, the constituent phases of the facecoat, as well as the constituent phases of the bulk of the mold, are important to the properties of the casting. As disclosed herein, the facecoat of the mold provides minimum reaction with the alloy during casting, and as a result the mold provides castings with the required component properties. External properties of the casting include features such as shape, geometry, and surface finish. Internal properties of the casting include mechanical properties, microstructure, and defects (such as pores and inclusions) below a critical size.

With respect to constituent phases of the facecoat of the mold and the bulk of the mold, calcium monoaluminate ($CaAl_2O_4$) is desirable for at least two reasons. First, calcium monoaluminate promotes hydraulic bond formation between the cement particles during the initial stages of mold making, and this hydraulic bonding provides mold strength during mold construction. Second, calcium monoaluminate experiences a very low rate of reaction with titanium and titanium aluminide based alloys.

In one embodiment, the facecoat comprises calcium monoaluminate ($CaAl_2O_4$), calcium dialuminate ($CaAl_4O_7$), mayenite ($Ca_{12}Al_{14}O_{33}$), silicon carbide, and alumina. In one embodiment, the size of the particles in the facecoat are less than 50 microns in outside dimension. In the facecoat, the combination of calcium monoaluminate ($CaAl_2O_4$), calcium dialuminate ($CaAl_4O_7$) is more than 50 weight percent, and the alumina concentration is less than 50 weight percent. There may be more than 20 weight percent calcium monoaluminate ($CaAl_2O_4$) in the facecoat. The region behind the facecoat and further away from the mold cavity is referred to as the bulk of the mold. In this bulk of the mold section, in one embodiment, the combination of calcium monoaluminate ($CaAl_2O_4$), calcium dialuminate ($CaAl_4O_7$) is less than 50 weight percent, and the alumina concentration in the bulk of the mold is greater than 50 weight percent.

The amount of silicon carbide in the facecoat can vary. For example, the amount of silicon carbide can be varied from 15 weight percent to 45 weight percent. The inventors of the instant disclosure discovered that not only is silicon carbide able to provide superior properties to the mold and facecoat in terms of stability at high temperatures and suitability for casting the titanium alloys, but also that a certain level of silicon carbide in the bulk and the facecoat was discovered to be optimal. For example, 35 weight percent in the facecoat provided can provide good results. If there is too much silicon carbide, that is, the level of silicon carbide is at or above 45 weight percent in the facecoat, then there is a possibility of carbon pick up during casting and an unacceptable level of carbon in the final part. On the other hand, if there is no silicon carbide or a minimal amount (e.g. less than about 20 weight percent), then the silicon carbide will not increase the thermal conductivity of the mold beyond the level of the thermal conductivity of the mold without the silicon carbide.

The use of a silicon carbide-containing intrinsic facecoat has significant advantages over the use of an extrinsic facecoat. Extrinsic facecoats that are used in casting titanium alloys are typically yttria based facecoats, or zirconia based facecoats. Specifically, extrinsic facecoats in molds that are used for casting can degenerate, crack, and spall during mold processing (such as removal of the fugitive pattern and firing) and casting. The pieces of facecoat that become detached from the extrinsic facecoat can become entrained in the casting when the mold is filled with molten metal, and the ceramic facecoat becomes an inclusion in the final part. The inclusion reduces the mechanical performance of the component that is produced from the casting.

Conventional investment mold compounds that consist of fused silica, cristobalite, gypsum, or the like, that are used in casting jewelry and dental prostheses are not suitable for casting reactive alloys, such as titanium alloys, because there is reaction between titanium and the investment mold. Any reaction between the molten alloy and the mold will deteriorate the properties of the final casting. The deterioration can be as simple as poor surface finish due to gas bubbles, or in more serious cases, the chemistry, microstructure, and properties of the casting can be compromised.

The challenge has been to produce an investment mold that does not react significantly with titanium and titanium aluminide alloys. In this regard, few if any prior poured ceramic investment compounds exist that meet the requirements for structural titanium and titanium aluminide alloys. There is a need for an investment mold that does not react significantly with titanium and titanium aluminide alloys. In prior approaches, in order to reduce the limitations of the conventional investment mold compounds, several additional mold materials were developed. For example, an investment compound was developed of an oxidation-expansion type in which magnesium oxide or zirconia was used as a main component and metallic zirconium was added to the main constituent to compensate for the shrinkage due to solidification of the cast metal. However, prior art investment compounds have limitations, as detailed supra.

The calcium aluminate cement of the present disclosure is referred to as a cement or binder, and in one embodiment, it is mixed with silicon carbide particles and alumina particles to make a castable investment mold mix. The calcium aluminate cement is typically >30% by weight in the castable investment mold mix; the use of this proportion of calcium aluminate cement is a feature of the present disclosure because it favors formation of a silicon carbide-containing intrinsic facecoat. Applicants found that the selection of the correct calcium aluminate cement chemistry and alumina formulation are important in determining the performance of the mold. In one example, in terms of the calcium aluminate cement, Applicants found that it is also necessary to have a particular amount of calcium oxide (CaO) in order to minimize reaction with the titanium alloy. If silicon carbide is absent, the thermal conductivity remains the same as the mold. Similarly, if the silicon carbide is too low (e.g., less than 15 weight %), the thermal conductivity is also the same as the mold. This would be less desired than when sufficient silicon carbide (15-45 weight percent) is present. If there is too much silicon carbide (for example, more than 45 weight %), the carbon activity in the mold is too high and carbon contamination of the casting occurs to above acceptable limits (for example, 500 ppm by weight).

The facecoat may comprise calcium aluminate cement with a particle size less than about 50 microns. The particle size of the calcium aluminate cement may, in another example, be less than about 10 microns. In one example, the bulk of the mold has particles greater than 50 microns in size and can contain alumina.

The facecoat has less alumina and more calcium aluminate cement than the bulk of the mold. The silicon carbide-containing intrinsic facecoat may have, by weight fraction, at least 20 percent more calcium aluminate, at least 20 percent less alumina, and at least 50 percent less mayenite than does the bulk of the mold. In one example, the calcium monoaluminate in the silicon carbide-containing intrinsic facecoat comprises a weight fraction of 0.1 to 0.9; the calcium dialuminate in the silicon carbide-containing intrinsic facecoat comprises a weight fraction of 0.05 to 0.90; and the mayenite in the silicon carbide-containing intrinsic facecoat comprises a weight fraction of 0.001 to 0.05. The increased weight fraction of calcium monoaluminate and dialuminate in the silicon carbide-containing intrinsic facecoat reduces the rate of reaction of the molten alloy with the mold during casting.

The initial cement slurry is mixed to have a viscosity of between 30 and 1500 centipoise. In one embodiment, viscosity range is between 50 and 500 centipoise. If the viscosity is too low, the slurry will not maintain all the solids in suspension, and settling of the heavier particles will occur and lead to segregation during curing, and a silicon carbide-containing intrinsic facecoat will not be formed. That is, if the final slurry mix viscosity is too low, settling of the heavier particles will occur during curing, and the mold will not have the required uniform composition throughout the bulk of the mold. If the viscosity is too high, the calcium aluminate particles can not partition to the fugitive pattern, and the intrinsic facecoat will not be formed. That is, if the final slurry/mix viscosity is too high, the final slurry mix will not flow around the fugitive pattern, and the internal cavity of the mold will not be suitable for casting the final required part. The final slurry with the calcium aluminate cement and the alumina particles is mixed to have a viscosity of between approximately 2000 and 8000 centipoise. The final slurry viscosity may range between 3000 and 6000 centipoise.

The investment mold may consist of multi-phase mixtures of fine-scale (<50 microns) calcium aluminate cement particles, fine-scale (<50 microns) alumina particles, fine-scale (<50 microns) silicon carbide, and larger scale (>100 microns) alumina particles. In one example, the intrinsic facecoat does not contain any alumina particles greater than 50 microns. The silicon carbide-containing intrinsic facecoat is formed because the fine-scale cement particles in suspension in the water-based investment mix partition preferentially to the fugitive/wax pattern during mold making, and forms an intrinsic facecoat layer that is enriched in the fine-scale particles (<50 microns), including the calcium monoaluminate, calcium dialuminate, silicon carbide, and alumina particles. In one embodiment, there are no large-scale alumina particles (>50 microns) in the facecoat. The slurry viscosity and the solids loading are factors in forming the silicon carbide-containing intrinsic facecoat. The absence of large-scale (>100 micron) particles in the intrinsic facecoat improves the surface finish of the mold and the resulting casting. The increased weight fraction of calcium monoaluminate and dialuminate in the intrinsic facecoat reduces the rate of reaction of the molten alloy with the mold during casting.

The silicon carbide is typically incorporated as particles with a size of less than 100 microns. The silicon carbide powder used for some examples described in the present disclosure had a particle size of up to about 45 microns, and less than about 20 microns in other examples that are described. The alumina can be incorporated as alumina particles, or hollow alumina particles. The particles can have a range of geometries, such as round particles, or irregular aggregate. The alumina particle size can be as small as 10 microns and as large as 10 mm. In one example the alumina consists of both round particles and bubbles or hollow particles, since these geometries increase the fluidity of the investment mold mixture.

The fluidity improves the surface finish and fidelity of the surface features of the final casting produced from the mold. The calcium aluminate cement particulate typically has a particle size of less than 50 microns. A particle size of less than 50 microns is used for three reasons: first, the fine particle size promotes the formation of hydraulic bonds during mold mixing and curing, second the fine particle size can promote inter-particle sintering during firing, and this can increase the mold strength, and third, the fine particle size improves surface finish of the mold cavity.

The calcium aluminate cement powder can be used either in its intrinsic form, or in an agglomerated form, such as spray dried agglomerates. The calcium aluminate cement can also be preblended with fine-scale (e.g., <10 micron) alumina before mixing with larger-scale alumina; the fine-scale alumina can provide an increase in strength due to sintering during high-temperature firing. Similarly, the silicon carbide particulate typically has a particle size of less than 100 microns, and preferably less than 50 microns; at this size it can be intimately mixed with the calcium aluminate cement particles, and it can contribute to the performance of the facecoat. The silicon carbide particles with a size of less than 100 microns can improve the surface finish of the mold and the subsequent cast component. If the silicon carbide particles are too large (more than 100 microns), for a given weight fraction of silicon carbide that is added, the particles do not generate the desired improvement (i.e. increase) in thermal conductivity.

In the bulk of the mold, the calcium aluminate cement is the binder, and the binder is considered the main skeleton of the mold structure behind the facecoat. It is the continuous phase in the mold and provides strength during curing, and casting. In one embodiment, the bulk of the mold composition comprises fine-scale (<50 microns) calcium aluminate cement particles, and larger scale (e.g., >100 microns) alumina particles. In another embodiment, the facecoat composition comprises calcium aluminate cement and silicon carbide.

The calcium aluminate cement that makes up the facecoat comprises at least three phases; calcium monoaluminate ($CaAl_2O_4$), calcium dialuminate ($CaAl_4O_7$), and mayenite ($Ca_{12}Al_{14}O_{33}$). In one embodiment, the facecoat can also contain fine-scale alumina particles. In another embodiment, the bulk of the mold behind the facecoat comprises calcium monoaluminate ($CaAl_2O_4$), calcium dialuminate ($CaAl_4O_7$), mayenite ($Ca_{12}Al_{14}O_{33}$), silicon carbide, and alumina. The alumina can be incorporated as alumina particles, for example hollow alumina particles. The silicon carbide and alumina particles can have a range of geometries, such as round particles, or irregular aggregates; furthermore, these particles may be hollow. The alumina particle size can be as small as 10 microns and as large as 10 mm.

In one embodiment, the alumina consists of both round particles and hollow particles, since these geometries increase the fluidity of the investment mold mixture. Typically the alumina particle size in the bulk of the mold is greater than 50 microns. The fluidity impacts the manner in which the cement partitions to the fugitive pattern (such as a wax) during pouring and setting of the investment mold mix around the fugitive pattern. The fluidity affects the surface finish and fidelity of the surface features of the final casting produced from the mold.

The calcium aluminate cement particulate that generates the facecoat typically has a particle size of less than 50 microns. A particle size of less than 50 microns has several advantages, including: first, the fine particle size promotes the formation of hydraulic bonds during mold mixing and curing, second the fine particle size can promote inter-particle sintering during firing, and this can increase the mold strength, and third, the fine particle size improves surface finish of the mold cavity. The calcium aluminate cement powder can be used either in its intrinsic form, or in an agglomerated form, such as spray dried agglomerates. The calcium aluminate cement can also be preblended with fine-scale (e.g., <10 micron) alumina before mixing with larger-scale alumina; the fine-scale alumina can provide an increase in strength due to sintering during high-temperature firing. However, if the alumina particles partition to the facecoat, the casting properties can be reduced.

For example, if the alumina particles partition to the facecoat, such that the silicon carbide-containing intrinsic facecoat has more alumina than the bulk of the mold, the molten alloy will react with the alumina in an undesirable way and generate gas bubbles that create surface defects and defects within the casting itself. The properties of the resulting casting, such as strength and fatigue strength are reduced. The presently disclosed methods allow for the formation of a facecoat that has significantly less alumina in the silicon carbide-containing intrinsic facecoat than in the bulk of the mold.

The treatment of the facecoat and the mold from room temperature to the final firing temperature can also be important, specifically the thermal history and the humidity profile. The heating rate to the firing temperature, and the cooling rate after firing are features of the present disclosure. If the facecoat and the mold are heated too quickly, they can crack internally or externally, or both; facecoat and mold cracking prior to casting is highly undesirable, it will generate poor surface finish, at least. In addition, if the mold and facecoat are heated too quickly the facecoat of the mold can crack and spall off; this can lead to undesirable inclusions in the final casting in the worst case, and poor surface finish, even if there are no inclusions. If the facecoat and the mold are cooled too quickly after reaching the maximum mold firing temperature, the facecoat or the bulk of the mold can also crack internally or externally, or both.

The solids loading of the initial cement mix and the solids loading of the final mold mix have important effects on the mold structure and the ability to form a silicon carbide-containing intrinsic facecoat within the mold. The percentage of solids loading is defined as the total solids in the mix divided by the total mass of the liquid and solids in the mix, described as a percentage. In one embodiment, the percentage of solids in the initial calcium aluminate-liquid cement mix is about 60 percent to about 78 percent.

If the solids loading in the initial cement slurry are less than about 70 percent, then the cement particles will not remain in suspension and during curing of the mold the cement particles will separate from the water and the composition will not be uniform throughout the mold. In contrast, if the solids loading is too high in the cement (for example greater than about 78 percent), the viscosity of the final mix with the large-scale alumina will be too high (for example greater than about 85%, depending on the amount, size, and morphology of the large-scale alumina particles that are added), and the cement particles in the mix will not be able to partition to the fugitive pattern within the mold, and the silicon carbide-containing intrinsic facecoat will not be formed.

The percentage of solids in the final calcium aluminate-liquid cement mix with the large-scale (for example, greater than about 50 microns, and greater than about 100 microns in another example) alumina particles may be about 75 percent to about 90 percent. The percentage of solids in the final calcium aluminate-liquid cement mix with the large-scale alumina particles may be about 78 percent to about 88 percent. In another example, the percentage of solids in the final calcium aluminate-liquid cement mix with the large-scale alumina particles is about 78 percent to about 84 percent. These alumina particles may be hollow. In a particular embodiment, the percentage of solids in the final calcium aluminate-liquid cement mix with the large-scale alumina particles is about 80 percent.

The Mold and Casting Methods

An investment mold is formed by formulating the investment mix of the ceramic components, and pouring the mix into a vessel that contains a fugitive pattern. The investment mold formed on the pattern is allowed to cure thoroughly to form a so-called "green mold." The silicon carbide-containing intrinsic facecoat and the investment mold are formed on the pattern and they are allowed to cure thoroughly to form this green mold. Typically, curing of the green mold is performed for times from 1 hour to 48 hours. Subsequently, the fugitive pattern is selectively removed from the green mold by melting, dissolution, ignition, or other known pattern removal technique. Typical methods for wax pattern removal include oven dewax (less than 150 degrees C.), furnace dewax (greater than 150 degrees C.), steam autoclave dewax, and microwave dewaxing.

For casting titanium alloys, and titanium aluminide and its alloys, the green mold then is fired at a temperature above 600 degrees C., for example 600 to 1400 degrees C., for a time period in excess of 1 hour, preferably 2 to 10 hours, to develop mold strength for casting and to remove any undesirable residual impurities in the mold, such as metallic species (Fe, Ni, Cr), and carbon-containing species. In one example, the firing temperature is at least 950 degrees C. The atmosphere of firing the mold is typically ambient air, although inert gas or a reducing gas atmosphere can be used.

The firing process also removes the water from the mold and converts the mayenite to calcium aluminate. Another purpose of the mold firing procedure is to minimize any free silica that remains in the facecoat and mold prior to casting. Other purposes are to remove the water, increase the high temperature strength, and increase the amount of calcium monoaluminate and calcium dialuminate.

The mold is heated from room temperature to the final firing temperature, specifically the thermal history is controlled. The heating rate to the firing temperature, and the cooling rate after firing are typically regulated or controlled. If the mold is heated too quickly, it can crack internally or externally, or both; mold cracking prior to casting is highly undesirable. In addition, if the mold is heated too quickly, the internal surface of the mold can crack and spall off. This can lead to undesirable inclusions in the final casting, and poor surface finish, even if there are no inclusions. Similarly, if the mold is cooled too quickly after reaching the maximum temperature, the mold can also crack internally or externally, or both.

The mold composition described in the present disclosure is particularly suitable for titanium and titanium aluminide alloys. The facecoat and the bulk of the mold composition after firing and before casting can influence the mold properties, particularly with regard to the constituent phases. In one embodiment, for casting purposes, a high weight fraction of calcium monoaluminate in the mold is used, for example, a weight fraction of 0.15 to 0.8. In addition, for casting purposes, it is desirable to minimize the weight fraction of the mayenite in the bulk of the mold and the silicon carbide-containing intrinsic facecoat, for example, using a weight fraction of 0.01 to 0.2, because mayenite is water sensitive and it can provide problems with water release and gas generation during casting. After firing, the mold can also contain small weight fractions of aluminosilicates and calcium aluminosilicates. The sum of the weight fraction of aluminosilicates and calcium aluminosilicates may typically be kept to less than 5% in the bulk of the mold and less than 0.5% in the facecoat, in order to minimize reaction of the mold with the casting.

One aspect of the present disclosure is a method for forming a casting mold for casting a titanium-containing article. The method comprises combining calcium aluminate and silicon carbide with a liquid to produce a slurry of calcium aluminate, wherein the percentage of solids in the initial calcium aluminate/liquid mixture is about 60% to about 80% by weight of the slurry and a viscosity of the slurry is about 30 to about 1500 centipoise. The method further includes the step of introducing the slurry into a mold cavity that contains a fugitive pattern, and allowing the slurry to cure in the mold cavity to form a mold of a titanium-containing article. Prior to the addition of the slurry into the mold cavity, oxide particles may be added, in one example, hollow aluminum oxide particles may be added. Silicon carbide may be added to the calcium aluminate before or during the making of the slurry. The silicon carbide particles may be from about 1 microns to about 1000 microns in outside dimension. In certain circumstances, the silicon carbide particles may be about 5 micron to about 100 microns in outside dimension. In a particular example, the silicon carbide particles are about 10 to about 50 microns in outside dimension. In one example, the particle size of the calcium aluminate is less than about 50 microns in outside dimension. The calcium aluminate cement may comprise more than 20% by weight of the composition used to make the mold.

Outside dimension refers to the longest distance between two points on a particle. If the particle is a circle, the outside dimension refers to the diameter. If the particle is an oval shape, then the outside dimension refers to the longest distance between two points that are the furthest away from each other on the circumference of the oval particle. Further still, if the particle is irregularly shaped, the outside dimension refers to the distance between two points on the irregularly shaped particle which are the furthest away from each other.

In certain embodiments, the casting-mold composition of the present disclosure comprises an investment casting-mold composition. The investment casting-mold composition comprises a near-net-shape, titanium-containing metal, investment casting mold composition. In one embodiment, the investment casting-mold composition comprises an investment casting-mold composition for casting near-net-shape titanium aluminide articles. The near-net-shape titanium aluminide articles comprise, for example, near-net-shape titanium aluminide turbine blades.

The selection of the correct calcium aluminate cement chemistry and alumina formulation are factors in the performance of the mold during casting. In terms of the calcium aluminate cement, it may be necessary to minimize the amount of free calcium oxide in order to minimize reaction with the titanium alloy. If the calcium oxide concentration in the cement is less than about 10% by weight, the alloy reacts with the mold because the alumina concentration is too high, and the reaction generates undesirable oxygen concentration levels in the casting, gas bubbles, and a poor surface finish in the cast component. Free alumina is less desirable in the mold material because it can react aggressively with titanium and titanium aluminide alloys.

The method may further comprise adding oxide particles into the slurry. The oxide particles are selected from a group consisting of aluminum oxide particles, magnesium oxide particles, calcium oxide particles, zirconium oxide particles, titanium oxide particles, silicon oxide particles, and compositions thereof. The oxide particles may be aluminum oxide (also known as alumina). The aluminum oxide particles can range in size and may be larger than about 50 microns. In particular instances, the added aluminum oxide particles that may be used are less than about 500 microns in outside dimension. The aluminum oxide particles may comprise from about 30% by weight to about 68% by weight of the composition used to make the mold. These oxide particles may be hollow.

If the calcium oxide concentration in the cement is greater than 50% by weight, the mold can be sensitive to pick up of water and carbon dioxide from the environment. As such, the calcium oxide concentration in the investment mold may typically be kept below 50%. In one embodiment, the calcium oxide concentration in the bulk of the investment mold is between 10% and 50% by weight. In one embodiment, the calcium oxide concentration in the bulk of the investment mold is between 10% and 40% by weight. Alternatively, the calcium oxide concentration in the bulk of the investment mold may be between 25% and 35% by weight. In one embodiment, the composition of CaO in the facecoat is between 20 and 40 percent by weight. In another example, the calcium oxide concentration in the facecoat of the mold is between 15% and 30% by weight.

Carbon dioxide can lead to formation of calcium carbonate in the mold during processing and prior to casting, and calcium carbonate is unstable during the casting operation. Thus, the water and carbon dioxide in the mold can lead to poor casting quality. If the adsorbed water level is too high, for example, greater than 0.05 weight percent, when the molten metal enters the mold during casting, the water is released and it can react with the alloy. This leads to poor surface finish, gas bubbles in the casting, high oxygen concentration, and poor mechanical properties. In addition, an amount of water can cause the mold to be incompletely filled. Similarly, if the carbon dioxide level is too high, calcium carbonate can form in the mold and when the molten metal enters the mold during casting, the calcium carbonate can decompose generating carbon dioxide, which can react with the alloy; if large amounts of carbon dioxide are released, the gas can cause the mold to be incompletely filled. The resulting calcium carbonate is less than 1 weight percent in the mold.

Prior to casting a molten metal or alloy, the investment mold typically is preheated to a mold casting temperature that is dependent on the particular component geometry or alloy to be cast. For example, a typical mold preheat temperature is 600 degrees C. Typically, the mold temperature range is 450 degrees C. to 1200 degrees C.; in one example, the temperature range is 450 degrees C. to 750 degrees C., and in certain cases it is 500 degrees C. to 650 degrees C.

According to one aspect, the molten metal or alloy is poured into the mold using conventional techniques which can include gravity, countergravity, pressure, centrifugal, and other casting techniques known to those skilled in the art. Furthermore, a vacuum or an inert gas atmosphere can also be used. For complex shaped thin wall geometries, techniques that use high pressure are preferred. After the solidified titanium aluminide or alloy casting is cooled typically to less than 650 degrees, for example, to room temperature, it is removed from the mold and finished using conventional techniques, such as, grit blasting, water jet blasting and polishing.

In one aspect, the present disclosure is a method for casting titanium and titanium alloys, comprising: obtaining an investment casting mold composition comprising calcium aluminate and large scale aluminum oxide, wherein the calcium aluminate and alumina are combined with a liquid and silicon carbide to produce a final calcium aluminate/liquid mixture slurry, and wherein the solids in the final mixture are about 70% to about 95% by weight of the slurry; pouring said investment casting mold composition into a vessel containing a fugitive pattern; curing said investment casting mold composition; removing said fugitive pattern from the mold; firing the mold; preheating the mold to a mold casting temperature; pouring molten titanium or titanium alloy into the heated mold; solidifying the molten titanium or titanium alloy; forming a solidified titanium or titanium alloy casting; and removing the solidified titanium or titanium alloy casting from the mold. The silicon carbide particles that are used are, in one example, about 10 microns to about 50 microns in outside dimension. In another example, they are 10 microns to about 100 microns in outside dimension. The silicon carbide was found to increase thermal conductivity during casting compared to if casting is performed in the absence of silicon carbide.

In one aspect, the present disclosure is a casting method for titanium and titanium alloys, comprising obtaining an investment casting mold composition comprising calcium aluminate and aluminum oxide, wherein the calcium aluminate is combined with a liquid and silicon carbide to produce a slurry, and wherein the solids in the final calcium aluminate/liquid mixture is about 75% to about 95%. The method may further comprise pouring said investment casting mold composition into a vessel containing a fugitive pattern; curing said investment casting mold composition; removing said fugitive pattern from the mold; and firing the mold. After firing of the mold, the method may further comprise preheating the mold to a mold casting temperature; pouring molten titanium or titanium alloy into the heated mold; solidifying the molten titanium or titanium alloy and forming a solidified titanium or titanium alloy casting; and removing the solidified titanium or titanium alloy casting from the mold.

The silicon carbide particles may be from about 10 microns to about 50 microns in outside dimension. The calcium aluminate particles may comprise particles less than about 50 microns in outside dimension. The aluminum oxide particles may be from about 50 microns to about 1500 microns in outside dimension. The aluminum oxide particles may comprise from about 30% by weight to about 68% by weight of the investment casting mold composition used to make the mold. The calcium aluminate cement may comprise more than 20% by weight of the investment casting mold composition used to make the mold. The aluminum oxide particles may be hollow. The calcium oxide may be added such that more than about 10% by weight and less than about 50% by weight of the investment casting mold composition is calcium oxide. The percentage of solids in an initial calcium aluminate-liquid cement mixture used to make the mold may be about 60% to about 78%. One aspect of the present disclosure is a titanium or titanium alloy article made by the casting method as recited by the presently disclosed methods.

Another aspect of the present disclosure is a casting method for titanium and titanium alloys comprising: obtaining an investment casting mold composition comprising calcium aluminate, wherein the calcium aluminate is combined with silicon carbide particles and alumina particles in a liquid to produce a slurry, such that the solids in the final calcium aluminate/liquid mixture is about 75% to about 95%, and wherein the resulting mold has a silicon carbide-containing intrinsic facecoat. In one embodiment, a titanium or titanium alloy article is claimed that is made by the casting method as taught herein.

Between removing the fugitive pattern from the mold and preheating the mold to a mold casting temperature, the mold is first heated, or fired, to a temperature of about 600 degrees C. to about 1400 degrees C., for example about 950 degrees C. or higher, and then cooled to room temperature. In one embodiment, the curing step is conducted at temperatures below about 30 degrees C. for between one hour to 48 hours. The removing of the fugitive pattern includes the step of melting, dissolution, ignition, oven dewaxing, furnace dewaxing, steam autoclave dewaxing, or microwave dewaxing. In one embodiment, after removing of the titanium or titanium alloy from the mold, the casting may be finished with grit blasting or polishing. In one embodiment, after the solidified casting is removed from the mold, it is inspected by X-ray or Neutron radiography.

The solidified casting is subjected to surface inspection and X-ray radiography after casting and finishing to detect any sub-surface inclusion particles at any location within the casting. X-ray radiography is employed to find inclusions that are not detectable by visual inspection of the exterior surface of the casting. The titanium aluminide casting is subjected to X-ray radiography (film or digital) using conventional X-ray equipment to provide an X-ray radiograph that then is inspected or analyzed to determine if any sub-surface inclusions are present within the titanium aluminide casting.

Alternately or in addition to X-ray radiography, the solidified casting can be subjected to other non-destructive testing, for example, conventional Neutron-ray radiography. The mold compositions described provide a small amount of a material having a high Neutron absorption cross section. In one aspect, a Neutron radiograph is prepared of the cast article. Since the titanium alloy cast article may be substantially transparent to neutrons, the mold material will typically show up distinctly in the resulting Neutron radiograph. In one aspect, it is believed that Neutron exposure results in "neutron activation" of the radiographically dense element. Neutron activation involves the interaction of the Neutron radiation with the radiographically dense element of the casting to effect the formation of radioactive isotopes of the radiographically dense elements of the mold composition. The radioactive isotopes may then be detectable by conventional radioactive detecting devices to count any radiographically dense element isotopes present in the cast article.

Another aspect of the present disclosure is a method for forming a casting mold for casting a titanium-containing article. The method includes: combining calcium aluminate with a liquid, such as water, to produce a slurry of calcium aluminate in the liquid; introducing the slurry into a vessel that contains a fugitive pattern; and allowing the slurry to cure in the mold cavity to form a mold of a titanium-containing article. In one embodiment, the method further comprises, before introducing the slurry into a mold cavity, introducing oxide particles, for example hollow oxide particles, to the slurry. Additionally, before introducing the slurry into the mold cavity, in one example, hollow particles of aluminum oxide as well as silicon carbide particles that are about 10 microns to about 100 microns are added.

The formed mold may be a green mold, and the method may further comprise firing the green mold. In one embodiment, the casting mold comprises an investment casting mold, for example, for casting a titanium-containing article. In one embodiment, the titanium-containing article comprises a titanium aluminide article. In one embodiment, the investment casting-mold composition comprises an investment casting-mold composition for casting near-net-shape titanium aluminide articles. The near-net-shape titanium aluminide articles may comprise near-net-shape titanium aluminide turbine blades. In one embodiment, the disclosure is directed to a mold formed from a titanium-containing article casting-mold composition, as taught herein. Another aspect of the present disclosure is directed to an article formed in the aforementioned mold.

Yet another aspect of the present disclosure is a titanium or titanium alloy casting made by a casting method comprising: obtaining an investment casting mold composition comprising calcium aluminate, silicon carbide, and aluminum oxide; pouring the investment casting mold composition into a vessel containing a fugitive pattern; curing the investment casting mold composition; removing the fugitive pattern from the mold; firing the mold; preheating the mold to a mold casting temperature; pouring molten titanium or titanium alloy into the heated mold; solidifying the molten titanium or titanium alloy to form the casting; and removing a solidified titanium or titanium alloy casting from the mold. In one embodiment, the present disclosure is directed to a titanium or titanium alloy article made by the casting methods taught in this application.

In one aspect, the present disclosure is a method for manufacturing a turbine component. The method comprises making a mold by mixing calcium aluminate, calcium dialuminate, silicon carbide, mayenite, and aluminum oxide together with water to form a slurry. The silicon carbide is present, in one example, at about 15% to about 45% by weight. The mold is then fired, and molten titanium or titanium alloy is poured into the mold. After the molten titanium or titanium alloy has cooled and solidified, the casting is removed from the mold. The silicon carbide-containing intrinsic facecoat comprises, in one example, silicon carbide that is present at about 15% to about 45% by weight.

Surface roughness is one of the important indices representing the surface integrity of cast and machined parts. Surface roughness is characterized by the centerline average roughness value "Ra", as well as the average peak-to-valley distance "Rz" in a designated area as measured by optical profilometry. A roughness value can either be calculated on a profile or on a surface. The profile roughness parameter (Ra, Rq, . . . ) are more common. Each of the roughness parameters is calculated using a formula for describing the surface. There are many different roughness parameters in use, but $R_a$ is by far the most common. As known in the art, surface roughness is correlated with tool wear. Typically, the surface-finishing process though grinding and honing yields surfaces with Ra in a range of 0.1 mm to 1.6 mm. The surface roughness Ra value of the final coating depends upon the desired function of the coating or coated article.

The average roughness, Ra, is expressed in units of height. In the Imperial (English) system, 1 Ra is typically expressed in "millionths" of an inch. This is also referred to as "microinches". The Ra values indicated herein refer to microinches. An Ra value of 70 corresponds to approximately 2 microns; and an Ra value of 35 corresponds to approximately 1 micron. It is typically required that the surface of high performance articles, such as turbine blades, turbine vanes/nozzles, turbochargers, reciprocating engine valves, pistons, and the like, have an Ra of about 20 or less. One aspect of the present disclosure is a turbine blade comprising titanium or titanium alloy and having an average roughness, Ra, of less than 20 across at least a portion of its surface area.

As the molten metals are heated higher and higher, they tend to become more and more reactive (e.g., undergoing unwanted reactions with the mold surface). Such reactions lead to the formation of impurities that contaminate the metal parts, which result in various detrimental consequences. The presence of impurities shifts the composition of the metal such that it may not meet the desired standard, thereby disallowing the use of the cast piece for the intended application. Moreover, the presence of the impurities can detrimentally affect the mechanical properties of the metallic material (e.g., lowering the strength of the material).

Furthermore, such reactions can lead to surface texturing, which results in substantial, undesirable roughness on the surface of the cast piece. For example, using the surface roughness value Ra, as known in the art for characterizing surface roughness, cast pieces utilizing stainless steel alloys and/or titanium alloys are typically exhibit an Ra value between about 100 and 200 under good working conditions. These detrimental effects drive one to use lower temperatures for filling molds. However, if the temperature of the molten metal is not heated enough, the casting material can cool too quickly, leading to incomplete filling of the cast mold.

One aspect of the present disclosure is directed to a mold composition for casting a titanium-containing article, comprising calcium aluminate and silicon carbide. The mold composition further comprises hollow alumina particles. The article comprises a metallic article. In one embodiment, the article comprises a titanium aluminide-containing article. In another embodiment, the article comprises a titanium aluminide turbine blade. In yet another embodiment, the article comprises a near-net-shape, titanium aluminide turbine blade. This near-net-shape, titanium aluminide turbine blade may require little or no material removal prior to installation.

One aspect of the present disclosure is directed to a device for casting titanium and titanium alloys. The device comprises a means for obtaining an investment casting mold composition comprising calcium aluminate, silicon caribide and aluminum oxide, wherein the calcium aluminate, silicon caribide and aluminum oxide particles are mixed in a liquid to produce a slurry; a means for pouring said investment casting mold composition into a vessel containing a fugitive pattern; a means for curing said investment casting mold composition; a means for removing said fugitive pattern from the mold; a means for firing the mold; a means for preheating the mold to a mold casting temperature; a means for pouring molten titanium or titanium alloy into the heated mold; a means for solidifying the molten titanium or titanium alloy and forming a solidified titanium or titanium alloy casting; and a means for removing the solidified titanium or titanium alloy casting from the mold.

EXAMPLES

The disclosure, having been generally described, may be more readily understood by reference to the following examples, which are included merely for purposes of illustration of certain aspects and embodiments of the present disclosure, and are not intended to limit the disclosure in any way.

FIG. 1 shows a schematic of the mold with the silicon carbide-containing facecoat (10). FIG. 1 shows the mold with the silicon carbide-containing intrinsic facecoat (30) that is, for example, approximately 100 microns thick. The schematic shows the silicon carbide-containing intrinsic facecoat (30) with the mold cavity (40) and the bulk of the mold (20) comprising the calcium aluminate mold. The intrinsic facecoat (40) is one that only contains species that are provided to the mold from the original constituents of the formulation. Thus, the intrinsic facecoat does not contain any species that did not come from the original poured ceramic formulation. In contrast, extrinsic facecoat is a facecoat that is applied separately and contains species that may not be in the components of the original formulation.

Figure 2:
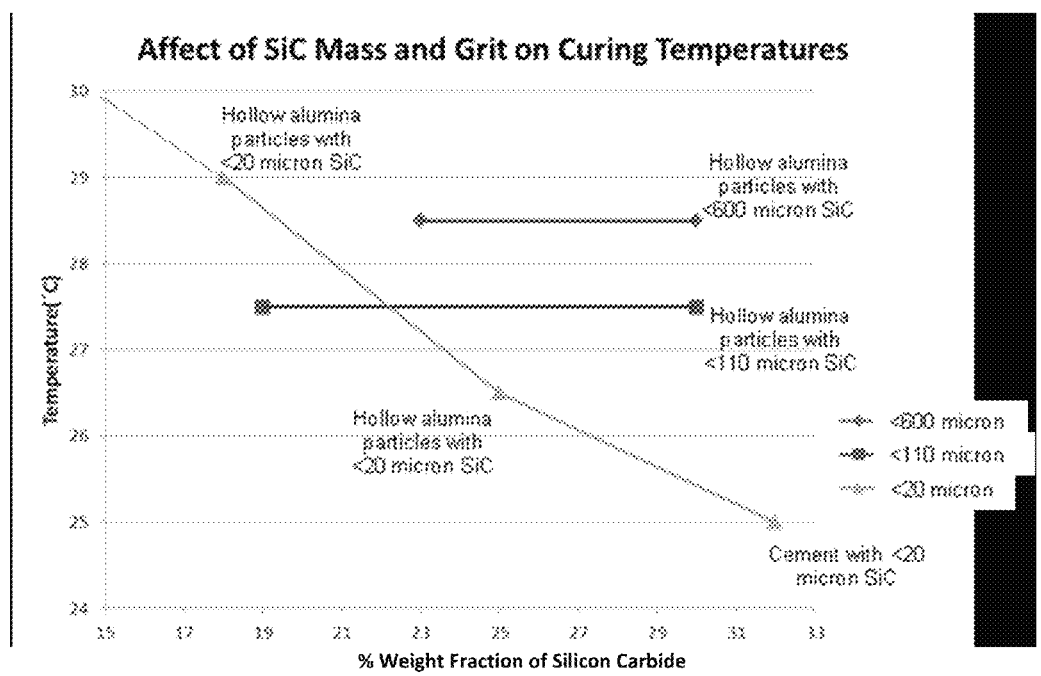
FIG. 2 shows the effect of silicon carbide size and weight fraction on the increase in temperature during curing.

As shown in FIG. 2, the replacement of large scale (particles with greater than about 50 microns in outside dimension) hollow alumina particles with a particle size of less than 20 micron SiC reduced the temperature increase during curing from about 30 degrees Celsius to <27 degrees Celsius. The graph shows that the replacement of large scale hollow alumina particles with CA25C cement reduced the temperature increase during curing from ~30 degrees Celsius to <25 degrees Celsius. The graph shows that the replacement of large scale hollow alumina particles with SiC particles of 600 microns or less in outside dimension has little effect on the temperature increase during curing. FIG. 2 further shows that the replacement of large scale hollow alumina particles with SiC particles of 110 microns or less in outside dimension has little effect on the temperature increase during curing.

FIG. 3 shows a flow chart, illustrating a method for forming a mold for casting a titanium-containing article (100). The method comprises mixing calcium aluminate and silicon carbide with a liquid to produce a slurry, wherein the percentage of solids in the slurry is about 60% to about 80% by weight of the slurry and a viscosity of the slurry is about 30 to about 1500 centipoise (110). The slurry is then introduced into a mold cavity that contains a fugitive pattern (120), and allowed to cure to form the mold (130).

FIG. 4 shows a flow chart, illustrating a method for casting titanium and titanium alloys (200). The method comprises obtaining an investment casting mold composition comprising calcium aluminate and large scale aluminum oxide, wherein the calcium aluminate and alumina are combined with a liquid and silicon carbide to produce a final calcium aluminate/liquid mixture slurry, and wherein the solids in the final mixture are about 70% to about 95% by weight of the slurry (210). This investment casting mold composition is then poured into a vessel containing a fugitive pattern (120), and cured (230). Once cured, the fugitive pattern is removed from the mold (240) and the mold is fired (250). After firing, the mold is preheated to a mold casting temperature (260), and molten titanium or titanium alloy is poured into the heated mold (270). The molten titanium or titanium alloy is allowed to form a solidified form (280) and this solidified titanium or titanium alloy casting is then removed from the mold (290).

FIG. 5 shows a flow chart, illustrating a turbine blade produced by the presently disclosed process (300). The method first provides for an investment casting mold comprising calcium aluminate, silicon carbide and aluminum oxide (360). The method further comprises pouring molten titanium or titanium alloy into the mold, having first preheated the mold prior to the pouring (370), and solidifying the molten titanium or titanium alloy casting to form a solidified casting (380). The final stage includes removing the solidified titanium or titanium alloy casting from the mold to produce a turbine blade, wherein the turbine blade has an average roughness, Ra, of less than 20 across at least a portion of its surface area (390).

FIG. 6 shows a flow chart, illustrating a method for manufacturing a turbine component (400). The method includes first making a mold from a mixture comprising calcium aluminate, calcium dialuminate, silicon carbide, mayenite and water, wherein the silicon carbide is present at about 15% to about 45% by weight (420). Additional steps include firing the mold (430), and pouring molten titanium or titanium alloy into the mold (440), solidifying the molten titanium or titanium alloy to form a solidified casting (450), and subsequently removing the casting from the mold (460).

In a first example, a mold was produced by replacing half of the cement in a nominal SiC-free mold with SiC particles with a size of less than 20 microns. In a first example, a slurry mixture for making an investment mold consisted of 1354 g of a commercially blended 80% calcium aluminate cement, CA25C. The CA25C product nominally consists of a 70% calcium aluminate cement blended with alumina to adjust the composition to 80% alumina. The particle size of the blended cement, CA25C, is less than 45 microns. A cement slurry with an initial solids loading of 61 percent was produced using 820.5 g of deionized water, and 90.5 g of colloidal silica. Typical suitable colloidal silicas include Remet LP30, Remet SP30, Nalco 1030. LP30 was used in this example.

When the slurry was mixed to an acceptable viscosity (90 to 150 centipoises), 1354 g of silicon carbide of a size range of less than about 20 microns was added to the slurry. The solids loading of the mix with the silicon carbide added was 75.6%. When the slurry was mixed to an acceptable viscosity, 1472 g of alumina bubble of a size range of less than about 0.85 mm and greater than about 0.5 mm was added to the slurry. For the alumina, the alumina bubbles are formed from molten alumina, resulting in hollow spheres of low bulk density.

After mixing, the investment mold mix was poured in a controlled manner into a vessel. The solids loading of the final mold mix was 82.7%. The mold mix poured well with satisfactory viscosity and rheology. After curing, the mix was of good strength (more than 100 pounds per square inch) and uniform composition. The mold was then fired at a temperature of 1000° C. for 4 hours. The final mold composition without the water contained 32.2 percent by weight of blended calcium aluminate cement (CA25C), 32.2 percent by weight of silicon carbide, and 35 percent by weight of alumina bubble with 0.6 percent silica. The mold possessed reduced alumina activity from those taught by the conventional molds.

In a second example half of the final bubble was replaced with the same amount of SiC with a particle size of less than 20 microns. In a second example, a slurry mixture for making an investment mold consisted of 5416 g of a commercially blended 80% calcium aluminate cement, CA25C, produced by the company Almatis. A cement slurry with an initial solids loading of 75.2 percent was produced using 1669 g of deionized water, and 181 g of colloidal silica. When the slurry was mixed to an acceptable viscosity, 1472 g of silicon carbide was added to the slurry. The solids loading of the mix with the silicon carbide added was 79.5%. When the slurry was mixed to an acceptable viscosity, 1472 g of alumina bubbles of a size range of less than 0.85 mm and greater than 0.5 mm was added to the slurry. After mixing, the investment mold mix was poured in a controlled manner into a vessel. The solids loading of the final mold mix was 82.4%. The resulting mold possessed a diameter of approximately 120 mm and a length of approximately 400 mm. In this second example, half of the final alumina bubble was replaced with the same amount of SiC with a particle size of less than 20 microns. A mold was produced and it was found to possess acceptable quality and a blade casting was produced from the mold.

The final mold composition without the water contained 64.4 percent by weight of blended calcium aluminate cement (CA25C), 17.5 percent by weight of silicon carbide, and 17.5 percent by weight of alumina bubble with 0.6 percent silica.

The amount of SiC and the amount of cement in the mold was found to be a factor in terms of improving mold quality. If the cement is reduced to a concentration that is too low, then the mold can be susceptible to cracking The size of SiC particles in the mold was also found to be important in terms of improving mold quality, such as external cracks and internal cracks. For example, if the SiC particle size is too large (greater than about 100 microns), then the internal cracking is unacceptable, as will be described in the next example.

A significant factor is the curing behavior of the mold, and during curing the mold temperature can increase. The results in FIG. 2 show the maximum temperature increase during curing of a range of molds. The graph shows that the replacement of large scale hollow alumina particles (alumina bubble) with a particle size of less than 20 microns in outside dimension SiC reduced the temperature increase during curing from about 30 degrees Celsius to <27 degrees Celsius. FIG. 2 shows that the replacement of large scale hollow alumina particles with CA25C cement reduced the temperature increase during curing from ~30 degrees Celsius to <25 degrees Celsius. The graph further shows that the replacement of large scale hollow alumina particles with a particle size of less than 600 microns or less SiC has little effect on the temperature increase during curing. Further, that replacing large scale (more than about 50 microns in outside dimension) with <110 microns in outside dimension SiC has little effect on the temperature increase during curing.

The mold was fired at a temperature of 1000° C. for 4 hours. The final mold composition without the water contained 24.1 percent blended calcium aluminate cement (CA25C), 40.3 silicon carbide, and 35 percent free alumina bubble with 0.6 percent silica. The mold possessed reduced alumina activity from those taught by the prior art.

In a third example half of the initial CA25C cement was replaced with the same amount of SiC with a particle size of less than 20 microns. In a third example, a slurry mixture for making an investment mold consisted of 2708 g of a commercially blended 80% calcium aluminate cement, CA25C. A cement slurry with an initial solids loading of 61.0 percent was produced using 1641 g of deionized water, and 181 g of colloidal silica. When the slurry was mixed to an acceptable viscosity, 2708 g of silicon carbide was added to the slurry. The solids loading of the mix with the silicon carbide added was 75.6%. When the slurry was mixed to an acceptable viscosity, 2943 g of alumina bubbles of a size range of less than 0.85 mm and greater than 0.5 mm was added to the slurry. After mixing, the investment mold mix was poured in a controlled manner into a vessel. The solids loading of the final mold mix was 82.6%. The resulting mold possessed a diameter of approximately 120 mm and a length of approximately 400 mm. In this third example half of the initial CA25C cement was replaced with the same amount of SiC with a particle size of less than 20 microns. A mold was produced but it was found to possess an unacceptable level of internal cracking and the subsequent casting was not of sufficient quality. The concentration of cement in the final formulation was too low.

The mold was fired at a temperature of 1000° C. for 4 hours. The final mold composition without the water contained 32.2 percent blended calcium aluminate cement (CA25C), 32.2 silicon carbide, and 35 percent alumina bubble with 0.6 percent silica. The mold possessed reduced free alumina activity from those taught by the prior art.

In a fourth example, a slurry mixture for making an investment mold consisted of 2708 g of a commercially blended 80% calcium aluminate cement, CA25C. A cement slurry with an initial solids loading of 61.0 percent was produced using 1641 g of deionized water, and 181 g of colloidal silica. When the slurry was mixed to an acceptable viscosity, 2943 g of alumina bubbles of a size range of less than 0.85 mm and greater than 0.5 mm was added to the slurry. When the slurry was mixed to an acceptable viscosity, 700 g of large scale silicon carbide with a particle size of <600 microns was added to the slurry. The viscosity of the slurry was unacceptable and a mold of acceptable quality could not be produced.

Typical high-purity calcined alumina particle types include fused, tabular, and levigated alumina. Typical suitable colloidal silicas include Remet LP30, Remet SP30, Nalco 1030, Ludox. The produced mold was used for casting titanium aluminide-containing articles such as turbine blades with a good surface finish. The roughness (Ra) value was less than 100 microinches, and with an oxygen content of less than 2000 parts per million [ppm]. The formulations generally produced a mold that was approximately 120 mm diameter and 400 mm long, and one that had a density of less than 2 grams per cubic centimeter.

In one embodiment, the mold possessed a silicon carbide-containing intrinsic facecoat that consisted of calcium aluminate phases, and the facecoat thickness was approximately 100 microns. The mold that was so produced was used successfully for casting titanium aluminide turbine blades with a good surface finish; for example, where the Ra was less than 100, and with an oxygen content of less than 2000 ppm. This formulation produced a mold that had a density of less than 2 grams per cubic centimeter.

In one example, the mold mix was prepared by mixing the calcium aluminate cement, water, and colloidal silica in a container. A high-shear form mixing was used. If not mixed thoroughly, the cement can gel, and the fluidity is reduced so that the mold mix will not cover the fugitive pattern uniformly, and the silicon carbide-containing intrinsic facecoat will not be generated. When the cement is in full suspension in the mixture, the alumina particles are added. For example, when the cement was in full suspension in the mixture, the fine-scale alumina particles are added. When the fine-scale alumina particles are fully mixed with the cement, the fine scale silicon carbide particulate are added and mixed with the cement slurry. When the fine-scale silicon carbide particles are fully mixed with the cement, the larger-size (for example, 0.5-1.0 mm) alumina particles are added and mixed with the cement-alumina formulation. The viscosity of the final mix is another factor for the formation of a high quality silicon carbide-containing intrinsic facecoat, as it must not be too low or too high. Another factor of the present disclosure is the solids loading of the cement mix and the amount of water. In addition, accelerants, and retarders can be used at selected points during the mold making process steps.

After mixing, the investment mix is poured in a controlled manner into a vessel that contains the fugitive wax pattern. The vessel provides the external geometry of the mold, and the fugitive pattern generates the internal geometry. The correct pour speed is a further feature, if it is too fast air can be entrapped in the mold, if it is too slow separation of the cement and the alumina particulate can occur. Suitable pour speeds range from about 1 to about 20 liters per minute. In one embodiment, the pour speed is about 2 to about 6 liters per minute. In a specific embodiment, the pour speed is about 4 liters per minute.

In one embodiment, the mold formulation was designed so that there was less than 1 percent linear shrinkage of both the facecoat of the mold, and the bulk of the mold, on firing. The lightweight fused alumina hollow particles incorporated in the mix provide low thermal conductivity. In one example, a solids loading of the initial cement slurry mixture with all components without the large-scale alumina particles is 60% and this value is below the desired limit for making a cement slurry that can form a silicon carbide containing facecoat in the mold. In one embodiment, the mold formed a silicon carbide-containing intrinsic facecoat with a thickness of approximately 100 microns.

The alumina hollow particles provide a mold with a reduced density and lower thermal conductivity. In one embodiment, the formulation produced a mold that was approximately 120 mm diameter and 400 mm long. The mold was cured and fired at high temperature. The produced mold was used for casting titanium aluminide-containing articles, such as turbine blades, with a good surface finish. The roughness (Ra) value was less than 100, and with an oxygen content of less than 2000 ppm. In most embodiments, the formulation produced a mold that had a density of less than 1.8 grams per cubic centimeter. In one embodiment, the thermal conductivity of the bulk of the mold is substantially less than that of alumina at all temperatures. The thermal conductivity was measured using hot wire platinum resistance thermometer technique (ASTM test C-1113).

In one example, the mold forms a silicon carbide-containing intrinsic facecoat, but the composition of the bulk of the mold, and in particular the composition of the facecoat, contains too much silica. The bulk composition of silica in the mold is about 1.5 weight percent. The high concentration of colloidal silica in the mix can lead to residual crystalline silica, and silicates, such as calcium aluminosilicate and aluminosilicate in the final fired mold. The high silica content of the mold, and the facecoat in particular, provides two limitations of this mold formulation. First, shrinkage can occur on firing and this leads to problems, such as cracking in the facecoat and dimensional control of the component. Second, the high silica content in the facecoat can cause reaction with the molten titanium and titanium aluminide alloys when the mold is filled during casting; this reaction leads to unacceptable casting quality.

In one example, where the solids loading of the final mold mix is 80% or higher (e.g. 81%), the mold has a uniform composition along the 16 inch length of the mold in both the bulk of the mold, and the silicon carbide-containing intrinsic facecoat of the mold. The bulk composition of silica in the mold is 0.6 weight percent. The mold forms a silicon carbide-containing intrinsic facecoat with a low silica content. The low silica content of the mold and in particular the silicon carbide-containing intrinsic facecoat provides a mold that is preferred for casting titanium and titanium aluminide alloys. The weight percentage of alumina hollow particles in the mold is about 35 percent. The mold forms a silicon carbide-containing intrinsic facecoat with a thickness of approximately 100 microns. The mold experiences less than 1 percent linear shrinkage on firing. The mold is suitable for casting.

In one embodiment, the mold formulation that is produced possesses some attractive attributes, but has several limitations. First, the silicon carbide-containing intrinsic facecoat in the mold is thinner than desired; this is due to high solids loading of the final mix prior to pouring. Second, where there is too much colloidal silica in the mold mix, this leads to too much silica, and resulting silicates, such as calcium aluminosilicate, in the bulk of the mold and in the silicon carbide-containing facecoat of the final mold after firing.

The high silica and silicate content of the mold and the facecoat in particular provides two limitations of this mold formulation. First, shrinkage can occur on firing and this leads to problems, such as cracking in the facecoat and dimensional control of the component. Second, the high silica content in the facecoat can cause reaction with the molten titanium aluminide alloy when the mold is filled during casting; this reaction leads to unacceptable casting quality. Lastly, if the alumina hollow particles size is too large, this reduces the fluidity of the resulting mix. The lower fluidity leads to a thinner silicon carbide-containing intrinsic facecoat, and the resulting mold produces castings with lower quality.

If the working time of the investment mold mix is too short, there is insufficient time to make large molds of complex-shaped components. If the working time of the investment mold mix is too long and the calcium aluminate cement does not cure sufficiently quickly, separation of the fine-scale cement and the large scale alumina can occur and this can lead to a segregated mold in which the formulation varies and the resulting mold properties are not uniform.

The colloidal silica can affect the rate of reaction of the calcium aluminate phases with water, and it can also affect the mold strength during curing. This rate of reaction of the calcium aluminate phases with water controls the working time of the investment mold mix during mold making This time was between about 30 seconds and about 10 minutes. If the working time of the investment mold mix is too short, there is insufficient time to make large molds of complex-shaped components, and the continuous silicon carbide-containing intrinsic facecoat is not formed. If the working time of the investment mold mix is too long and the calcium aluminate cement does not cure sufficiently quickly, separation of the fine-scale cement and the large scale alumina can occur and this can lead to a segregated mold in which the formulation varies and the resulting mold properties are not uniform; it can also lead to the undesirable position of having a silicon carbide-containing facecoat that is not continuous or varies in constituents and properties.

The constituent phases in the cement that makes up the continuous facecoat of the mold, and provides the binder for the bulk of the mold, are a feature of the present disclosure. The three phases in the calcium aluminate cement comprises calcium monoaluminate ($CaAl_2O_4$), calcium dialuminate ($CaAl_4O_7$), and mayenite ($Ca_{12}Al_{14}O_{33}$), and the inventors made this selection to achieve several purposes. First, the phases must dissolve or partially dissolve and form a suspension that can support all the aggregate phases in the subsequent investment mold making slurry. Second, the phases must promote setting or curing of the mold after pouring. Third, the phases must provide strength to the mold during and after casting. Fourth, the phases must exhibit minimum reaction with the titanium alloys that is cast in the mold. Fifth, the mold must have a suitable thermal expansion match with the titanium alloy casting in order to minimize the thermal stress on the part that is generated during post-solidification cooling.

The three phases in the calcium aluminate cement/binder in the mold and in the facecoat of the mold are, in one example, calcium monoaluminate ($CaAl_2O_4$), calcium dialuminate ($CaAl_4O_7$), mayenite ($Ca_{12}Al_{14}O_{33}$), and silicon carbide. The mayenite is incorporated in the mold because it is a fast setting calcium aluminate and it provides the silicon carbide-containing intrinsic facecoat and the bulk of the mold with strength during the early stages of curing. Curing must be performed at low temperatures, because the fugitive wax pattern is temperature sensitive and loses its shape and properties on thermal exposure above ~35 deg C. In one example, the mold is cured at temperatures below 30 deg C.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A mold for casting a titanium-containing article, comprising:
   a calcium aluminate cement comprising calcium monoaluminate, calcium dialuminate, and mayenite, wherein said mold has a silicon carbide-containing intrinsic facecoat with a thickness of about 10 microns to about 500 disposed microns between a bulk of the mold and a mold cavity.

2. The mold as recited in claim 1, wherein the silicon carbide-containing intrinsic facecoat is a continuous intrinsic facecoat.

3. The mold as recited in claim 1, wherein the silicon carbide is present at about 15% to about 45% by weight.

4. The mold as recited in claim 1, wherein the mold comprises the bulk of the mold and the silicon carbide-containing intrinsic facecoat, and wherein the bulk of the mold and the silicon carbide-containing intrinsic facecoat have different compositions and wherein the silicon carbide-containing intrinsic facecoat comprises calcium aluminate with a particle size of less than about 50 microns.

5. The mold as recited in claim 1, wherein the mold comprises the bulk of the mold and the silicon carbide-containing intrinsic facecoat, and wherein the bulk of the mold and the silicon carbide-containing intrinsic facecoat have different compositions and wherein the bulk of the mold comprises alumina particles larger than about 50 microns.

6. The mold as recited in claim 1, wherein the mold comprises the bulk of the mold and the silicon carbide-containing intrinsic facecoat, and wherein the bulk of the mold comprises alumina particles larger than about 50 microns and the silicon carbide-containing intrinsic facecoat comprises calcium aluminate particles less than about 50 microns in size.

7. The mold as recited in claim 1, wherein the silicon carbide-containing intrinsic facecoat has, by weight fraction, at least 20 percent more calcium monoaluminate than does the bulk of the mold.

8. The mold as recited in claim 1, wherein the silicon carbide-containing intrinsic facecoat further comprises alumina and the level of alumina, by weight fraction, is at least 20 percent less than is present in the bulk of the mold.

9. The mold as recited in claim 1, wherein the silicon carbide-containing intrinsic facecoat further comprises alumina and the level of alumina, by weight fraction, is at least 20 percent less than is present in the bulk of the mold, and wherein the silicon carbide-containing intrinsic facecoat has at least 20 percent more calcium aluminate, and at least 50 percent less mayenite than does the bulk of the mold.

10. The mold as recited in claim 1, further comprising silicon carbide wherein the silicon carbide-containing intrinsic facecoat has, by weight fraction, at least 10 percent more silicon carbide than the bulk of the mold.

11. The mold as recited in claim 1, wherein the weight fraction of calcium monoaluminate in the silicon carbide-containing intrinsic facecoat is more than 0.45 and the weight fraction of mayenite is less than 0.10.

12. The mold as recited in claim 1, wherein said calcium monoaluminate in the bulk of the mold comprises a weight fraction of about 0.05 to 0.95, and said calcium monoaluminate in the silicon carbide-containing intrinsic facecoat is about 0.10 to 0.90.

13. The mold as recited in claim 1, wherein said calcium dialuminate in the bulk of the mold comprises a weight fraction of about 0.05 to about 0.80, and said calcium dialuminate in the silicon carbide-containing intrinsic facecoat is about 0.05 to 0.90.

14. The mold as recited in claim 1, wherein said mayenite in the bulk of the mold composition comprises a weight fraction of about 0.01 to about 0.30, and said mayenite in the silicon carbide-containing intrinsic facecoat is about 0.001 to 0.05.

15. The mold as recited in claim 1, wherein said calcium monoaluminate in the bulk of the mold comprises a weight fraction of about 0.05 to 0.95, and said calcium monoaluminate in the silicon carbide-containing intrinsic facecoat is about 0.1 to 0.9; said calcium dialuminate in the bulk of the mold comprises a weight fraction of about 0.05 to about 0.80, and said calcium dialuminate in the silicon carbide-containing intrinsic facecoat is about 0.05 to 0.90; and wherein said mayenite in the bulk of the mold composition comprises a weight fraction of about 0.01 to about 0.30, and said mayenite in the silicon carbide-containing intrinsic facecoat is about 0.001 to 0.05.

16. The mold as recited in claim 1, further comprising aluminum oxide particles in the bulk of the mold that are less than about 500 microns in outside dimension.

17. The mold as recited in claim 1, wherein the calcium aluminate comprises more than 20% by weight of the composition used to make the mold.

18. The mold as recited in claim 1, further comprising aluminum oxide particles, magnesium oxide particles, calcium oxide particles, zirconium oxide particles, titanium oxide particles, silicon oxide particles, or compositions thereof.

19. The mold as recited in claim 18, wherein said aluminum oxide particles comprise from about 30% by weight to about 68% by weight of the composition used to make the mold.

20. The mold as recited in claim 1, further comprising hollow particles of aluminum oxide.

21. The mold as recited in claim 1, further comprising calcium oxide with more than about 10% by weight and less than about 50% by weight of the mold composition in calcium oxide.

22. The mold as recited in claim 1, wherein a percentage of solids in an initial calcium aluminate-liquid cement mixture used to make the mold is about 60 to about 78%.

23. The mold as recited in claim 1, wherein a percentage of solids in a final calcium aluminate-liquid cement mixture with large scale alumina used to make the mold, is from about 70% to about 95%.

24. The mold as recited in claim 1, wherein the mold further comprises less than 2% silica.

25. A facecoat composition of a mold that is used for casting a titanium-containing article, comprising:
    calcium monoaluminate, calcium dialuminate, silicon carbide, and mayenite, wherein said facecoat composition is a silicon carbide-containing intrinsic facecoat, is about 10 microns to about 500 microns thick, and is located between a bulk of the mold and a surface of the mold that opens to a mold cavity.

26. The facecoat composition of claim 25, wherein the silicon carbide-containing facecoat comprises calcium aluminate having a particle size of less than about 50 microns.

27. The facecoat composition as recited in claim 26, wherein the silicon carbide-containing intrinsic facecoat has, by weight fraction, at least 20 percent more calcium aluminate, at least 20 percent less alumina, and at least 50 percent less mayenite than does the bulk of the mold.

28. The facecoat composition as recited in claim 25, wherein the weight fraction of calcium monoaluminate in the silicon carbide-containing intrinsic facecoat is more than 0.45 and the weight fraction of mayenite is less than 0.10.

29. The facecoat composition of claim 25, further comprising silicon carbide wherein the silicon carbide-containing intrinsic facecoat has, by weight fraction, at least 10 percent more silicon carbide than does the bulk of the mold.

30. The facecoat composition of claim 25, further comprising silicon carbide wherein the silicon carbide is present at about 15% to about 45% by weight of the facecoat composition.

* * * * *